US009362998B2

(12) United States Patent
He et al.

(10) Patent No.: US 9,362,998 B2
(45) Date of Patent: Jun. 7, 2016

(54) HYBRID AUTOMATIC REPEAT REQUEST-ACKNOWLEDGE (HARQ-ACK) CODEBOOK GENERATION FOR INTER-BAND TIME DIVISION DUPLEX (TDD) CARRIER AGGREGATION (CA)

(71) Applicant: INTEL CORPORATION, Santa Clara, CA (US)

(72) Inventors: Hong He, Beijing (CN); Jong-Kae Fwu, Sunnyvale, CA (US); Seunghee Han, Kyoungkido (KR); Debdeep Chatterjee, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 92 days.

(21) Appl. No.: 14/129,128
(22) PCT Filed: Jul. 29, 2013
(86) PCT No.: PCT/US2013/052584
§ 371 (c)(1),
(2) Date: Dec. 24, 2013
(87) PCT Pub. No.: WO2014/018984
PCT Pub. Date: Jan. 30, 2014

(65) Prior Publication Data
US 2015/0131494 A1    May 14, 2015

Related U.S. Application Data

(60) Provisional application No. 61/676,775, filed on Jul. 27, 2012.

(51) Int. Cl.
*H04B 7/04* (2006.01)
*H04W 24/04* (2009.01)
(Continued)

(52) U.S. Cl.
CPC ............. *H04B 7/046* (2013.01); *H04B 7/0417* (2013.01); *H04B 7/0452* (2013.01);
(Continued)

(58) Field of Classification Search
CPC .... H04B 7/046; H04B 7/0452; H04L 5/0053; H04W 72/046
See application file for complete search history.

(56) References Cited

U.S. PATENT DOCUMENTS

2009/0323613 A1    12/2009  Frederiksen et al.
2010/0150081 A1    6/2010   Gao et al.
(Continued)

FOREIGN PATENT DOCUMENTS

KR    10-2011-0048226 A    5/2011
WO    2011/123975 A1       10/2011
(Continued)

OTHER PUBLICATIONS

International Search Report and Written Opinion received for PCT Patent Application No. PCT/US2013/052584, mailed on Nov. 26, 2013, 11 Pages.
(Continued)

*Primary Examiner* — Kwang B Yao
*Assistant Examiner* — Hien Nguyen
(74) *Attorney, Agent, or Firm* — Thorpe North & Western LLP

(57) ABSTRACT

Technology to determine a Hybrid Automatic Repeat reQuest-ACKnowledge (HARQ-ACK) codebook size for inter-band time division duplex (TDD) carrier aggregation (CA) is disclosed. In an example, a user equipment (UE) operable to determine a HARQ-ACK codebook size for inter-band TDD CA can include computer circuitry configured to: Determine a HARQ bundling window for inter-band TDD CA including a number of downlink (DL) subframes using HARQ-ACK feedback; divide the HARQ bundling window into a first part and a second part; and calculate the HARQ-ACK codebook size based on the first part and the second part. The first part can include DL subframes of configured serving cells that occur no later than the DL subframe where a downlink control information (DCI) transmission for uplink scheduling on a serving cell is conveyed, and the second part can include physical downlink shared channel (PDSCH) subframes occurring after the DCI transmission of the serving cells.

26 Claims, 16 Drawing Sheets

(51) Int. Cl.
*H04W 36/00* (2009.01)
*H04B 7/06* (2006.01)
*H04L 1/18* (2006.01)
*H04L 5/00* (2006.01)
*H04W 72/04* (2009.01)
*H04W 36/04* (2009.01)
*H04W 88/08* (2009.01)

(52) U.S. Cl.
CPC .......... *H04B 7/0469* (2013.01); *H04B 7/0478* (2013.01); *H04B 7/0639* (2013.01); *H04L 1/1812* (2013.01); *H04L 5/0053* (2013.01); *H04L 5/0055* (2013.01); *H04W 24/04* (2013.01); *H04W 36/0083* (2013.01); *H04W 72/042* (2013.01); *H04W 72/046* (2013.01); *H04W 72/0413* (2013.01); *H04W 36/04* (2013.01); *H04W 88/08* (2013.01); *Y02B 60/50* (2013.01)

(56) References Cited

U.S. PATENT DOCUMENTS

| | | |
|---|---|---|
| 2010/0265843 A1 | 10/2010 | Yang et al. |
| 2011/0044278 A1 | 2/2011 | Astely et al. |
| 2012/0106407 A1 | 5/2012 | Papasakellariou et al. |
| 2012/0140726 A1* | 6/2012 | Moon et al. ................... 370/329 |
| 2013/0194981 A1* | 8/2013 | Wang et al. ................... 370/280 |
| 2013/0294299 A1* | 11/2013 | Park et al. ................... 370/280 |
| 2014/0219185 A1* | 8/2014 | Etemad et al. ............... 370/329 |

FOREIGN PATENT DOCUMENTS

| | | |
|---|---|---|
| WO | 2011/134109 A1 | 11/2011 |
| WO | 2014/018984 A1 | 1/2014 |

OTHER PUBLICATIONS

3GPP TS 36.211 V10.4.0 (Dec. 2011), 3rd Generation Partnership Project; Technical Specification Group Radio Access Network; Evolved Universal Terrestrial Radio Access (E-UTRA); Physical Channels and Modulation (release 10), 101 pages.

3GPP TS 36213V10.4.0 (Dec. 2011), 3rd Generation Partnership Project; Technical Specification Group Radio Access Network; Evolved Universal Terrestrial Radio Access (E-UTRA); Physical layer procedures (release 10), 115 pages.

Samsung, "Ul Dai for Dl Ca", 3GPP Tsg Ran WG1 R1-110727, Discussion and Decision, Feb. 2011, Meeting 64, Agenda 6.2.1, 4 pp., Taipei, Taiwan.

\* cited by examiner

| UL-DL configuration for PDSCH HARQ timing reference | | SCell SIB1 UL-DL configuration | | | | | | |
|---|---|---|---|---|---|---|---|---|
| | | 0 | 1 | 2 | 3 | 4 | 5 | 6 |
| PCell SIB1 UL-DL configuration | 0 | 0 | 1 | 2 | 3 | 4 | 5 | 6 |
| | 1 | 1 | 1 | 2 | 4 | 4 | 5 | 1 |
| | 2 | 2 | 2 | 2 | 5 | 5 | 5 | 2 |
| | 3 | 3 | 4 | 5 | 3 | 4 | 5 | 3 |
| | 4 | 4 | 4 | 5 | 4 | 4 | 5 | 4 |
| | 5 | 5 | 5 | 5 | 5 | 5 | 5 | 5 |
| | 6 | 6 | 1 | 2 | 3 | 4 | 5 | 6 |

FIG. 6
(Table 4)

US 9,362,998 B2

HYBRID AUTOMATIC REPEAT REQUEST-ACKNOWLEDGE (HARQ-ACK) CODEBOOK GENERATION FOR INTER-BAND TIME DIVISION DUPLEX (TDD) CARRIER AGGREGATION (CA)

RELATED APPLICATIONS

This application claims the benefit of and hereby incorporates by reference U.S. Provisional Patent Application Ser. No. 61/676,775, filed Jul. 27, 2012.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protoCols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16 e, 802.16 m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In LTE, data can be transmitted from the eNodeB to the UE via a physical downlink shared channel (PDSCH). A physical uplink control channel (PUCCH) or physical uplink shared channel (PUSCH) can be used to acknowledge that data was received. Downlink and uplink channels or transmissions can use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission can operate using different frequency carriers (i.e. separate carrier frequency for each transmission direction). In FDD, interference can be avoided because the downlink signals use a different frequency carrier from the uplink signals.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 6 (i.e., Table 4) illustrates a table of an UpLink-DownLink (UL-DL) configuration number of Physical Downlink Shared CHannel (PDSCH) Hybrid Automatic Repeat reQuest-ACKnowledge (HARQ-ACK) timing reference for a Secondary Cell (SCell) in accordance with an example;

Figure 1:
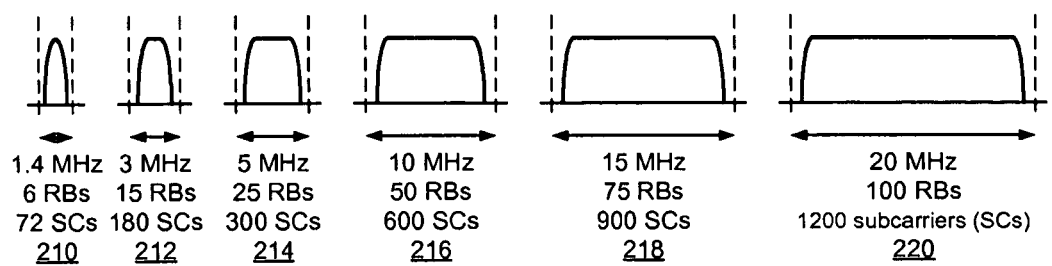
FIG. 1 illustrates a block diagram of various component carrier (CC) bandwidths in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

All tables cited herein from the 3GPP LTE standard are provided from Release 11 of the 3GPP LTE standard, unless otherwise noted.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An increase in the amount of wireless data transmission has created congestion in wireless networks using licensed spectrum to provide wireless communication services for wireless devices, such as smart phones and tablet devices. The congestion is especially apparent in high density and high use locations such as urban locations and universities.

One technique for providing additional bandwidth capacity to wireless devices is through the use carrier aggregation of multiple smaller bandwidths to form a virtual wideband channel at a wireless device (e.g., UE). In carrier aggregation (CA) multiple component carriers (CC) can be aggregated and jointly used for transmission to/from a single terminal. Carriers can be signals in permitted frequency domains onto which information is placed. The amount of information that can be placed on a carrier can be determined by the aggregated carrier's bandwidth in the frequency domain. The permitted frequency domains are often limited in bandwidth. The bandwidth limitations can become more severe when a large number of users are simultaneously using the bandwidth in the permitted frequency domains.

FIG. 1 illustrates a carrier bandwidth, signal bandwidth, or a component carrier (CC) that can be used by the wireless device. For example, the LTE CC bandwidths can include: 1.4 MHz 210, 3 MHz 212, 5 MHz 214, 10 MHz 216, 15 MHz 218, and 20 MHz 220. The 1.4 MHz CC can include 6 resource blocks (RBs) comprising 72 subcarriers. The 3 MHz CC can include 15 RBs comprising 180 subcarriers. The 5 MHz CC can include 25 RBs comprising 300 subcarriers. The 10 MHz CC can include 50 RBs comprising 600 subcarriers. The 15 MHz CC can include 75 RBs comprising 900 subcarriers. The 20 MHz CC can include 100 RBs comprising 1200 subcarriers.

Carrier aggregation (CA) enables multiple carrier signals to be simultaneously communicated between a user's wireless device and a node. Multiple different carriers can be used. In some instances, the carriers may be from different permitted frequency domains. Carrier aggregation provides a broader choice to the wireless devices, enabling more bandwidth to be obtained. The greater bandwidth can be used to communicate bandwidth intensive operations, such as streaming video or communicating large data files.

Figure 2A:
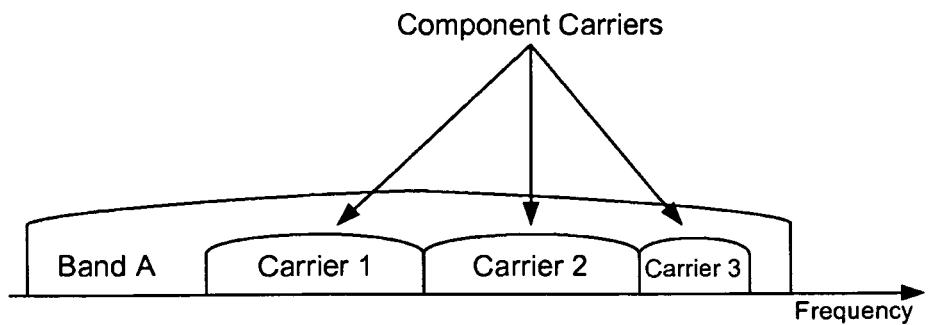
FIG. 2A illustrates a block diagram of multiple contiguous component carriers in accordance with an example.

FIG. 2A illustrates an example of carrier aggregation of continuous carriers. In the example, three carriers are contiguously located along a frequency band. Each carrier can be referred to as a component carrier. In a continuous type of system, the component carriers are located adjacent one another and can be typically located within a single frequency band (e.g., band A). A frequency band can be a selected frequency range in the electromagnetic spectrum. Selected frequency bands are designated for use with wireless communications such as wireless telephony. Certain frequency bands are owned or leased by a wireless service provider. Each adjacent component carrier may have the same bandwidth, or different bandwidths. A bandwidth is a selected portion of the frequency band. Wireless telephony has traditionally been conducted within a single frequency band. In contiguous carrier aggregation, only one fast Fourier transform (FFT) module and/or one radio frontend may be used. The contiguous component carriers can have similar propagation characteristics which can utilize similar reports and/or processing modules.

Figure 2B:
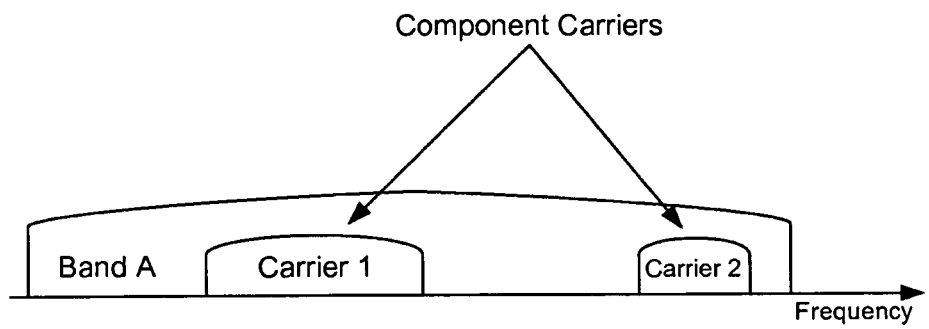
FIG. 2B illustrates a block diagram of intra-band non-contiguous component carriers in accordance with an example.
Figure 2C:
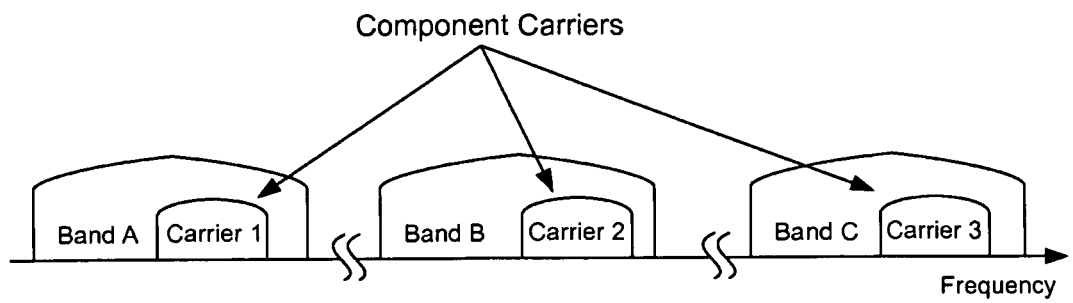
FIG. 2C illustrates a block diagram of inter-band non-contiguous component carriers in accordance with an example.

FIGS. 2B-2C illustrates an example of carrier aggregation of non-continuous component carriers. The non-continuous component carriers may be separated along the frequency range. Each component carrier may even be located in different frequency bands. Non-contiguous carrier aggregation can provide aggregation of a fragmented spectrum. Intra-band (or single-band) non-contiguous carrier aggregation provides non-contiguous carrier aggregation within a same frequency band (e.g., band A), as illustrated in FIG. 2B. Inter-band (or multi-band) non-contiguous carrier aggregation provides non-contiguous carrier aggregation within different frequency bands (e.g., bands A, B, or C), as illustrated in FIG. 2C. The ability to use component carriers in different frequency bands can enable more efficient use of available bandwidth and increases the aggregated data throughput.

Figure 3A:
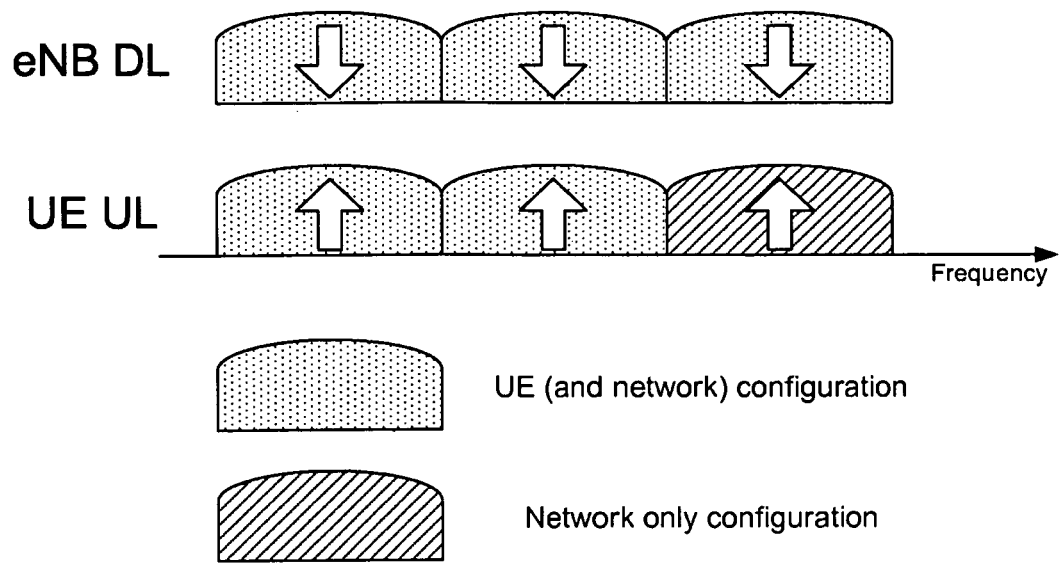
FIG. 3A illustrates a block diagram of a symmetric-asymmetric carrier aggregation configuration in accordance with an example.
Figure 3B:
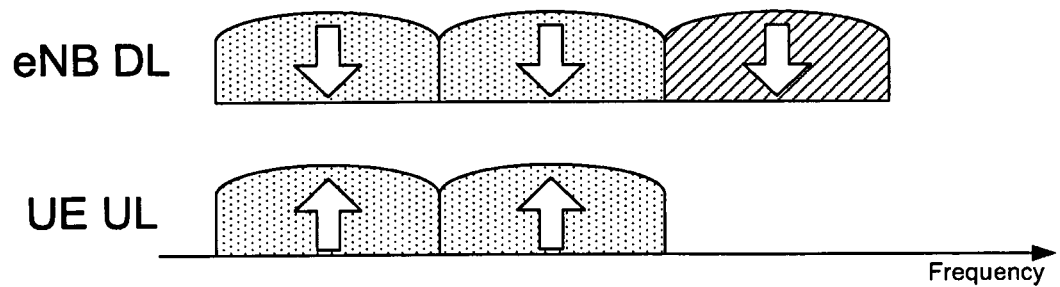
FIG. 3B illustrates a block diagram of an asymmetric-symmetric carrier aggregation configuration in accordance with an example.

Network symmetric (or asymmetric) carrier aggregation can be defined by a number of downlink (DL) and uplink (UL) component carriers offered by a network in a sector. UE symmetric (or asymmetric) carrier aggregation can be defined by a number of downlink (DL) and uplink (UL) component carriers configured for a UE. The number of DL CCs may be at least the number of UL CCs. A system information block type 2 (SIB2) can provide specific linking between the DL and the UL. FIG. 3A illustrates a block diagram of a symmetric-asymmetric carrier aggregation configuration, where the carrier aggregation is symmetric between the DL and UL for the network and asymmetric between the DL and UL for the UE. FIG. 3B illustrates a block diagram of an asymmetric-symmetric carrier aggregation configuration, where the carrier aggregation is asymmetric between the DL and UL for the network and symmetric between the DL and UL for the UE.

For each UE, a CC can be defined as a primary cell (PCell). Different UEs may not necessarily use a same CC as their PCell. The PCell can be regarded as an anchor carrier for the UE and the PCell can thus be used for control signaling functionalities, such as radio link failure monitoring, hybrid automatic repeat request-acknowledgement (HARQ-ACK), and PUCCH resource allocations (RA). If more than one CC is configured for a UE, the additional CCs can be denoted as secondary cells (SCells) for the UE.

Figure 4:
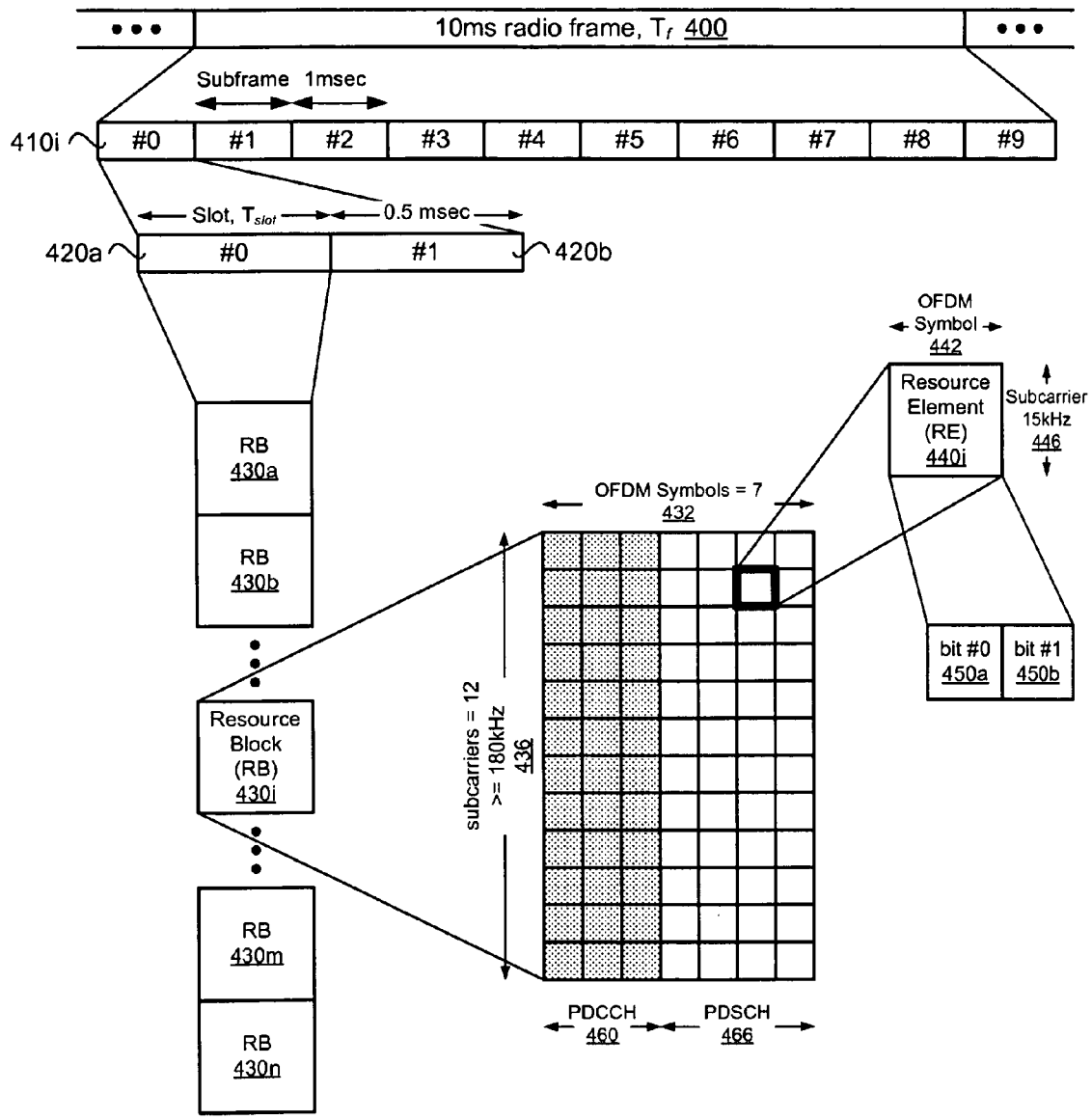
FIG. 4 illustrates a diagram of downlink radio frame resources (e.g., a downlink resource grid) including a legacy physical downlink control channel (PDCCH) in accordance with an example.
Figure 5:
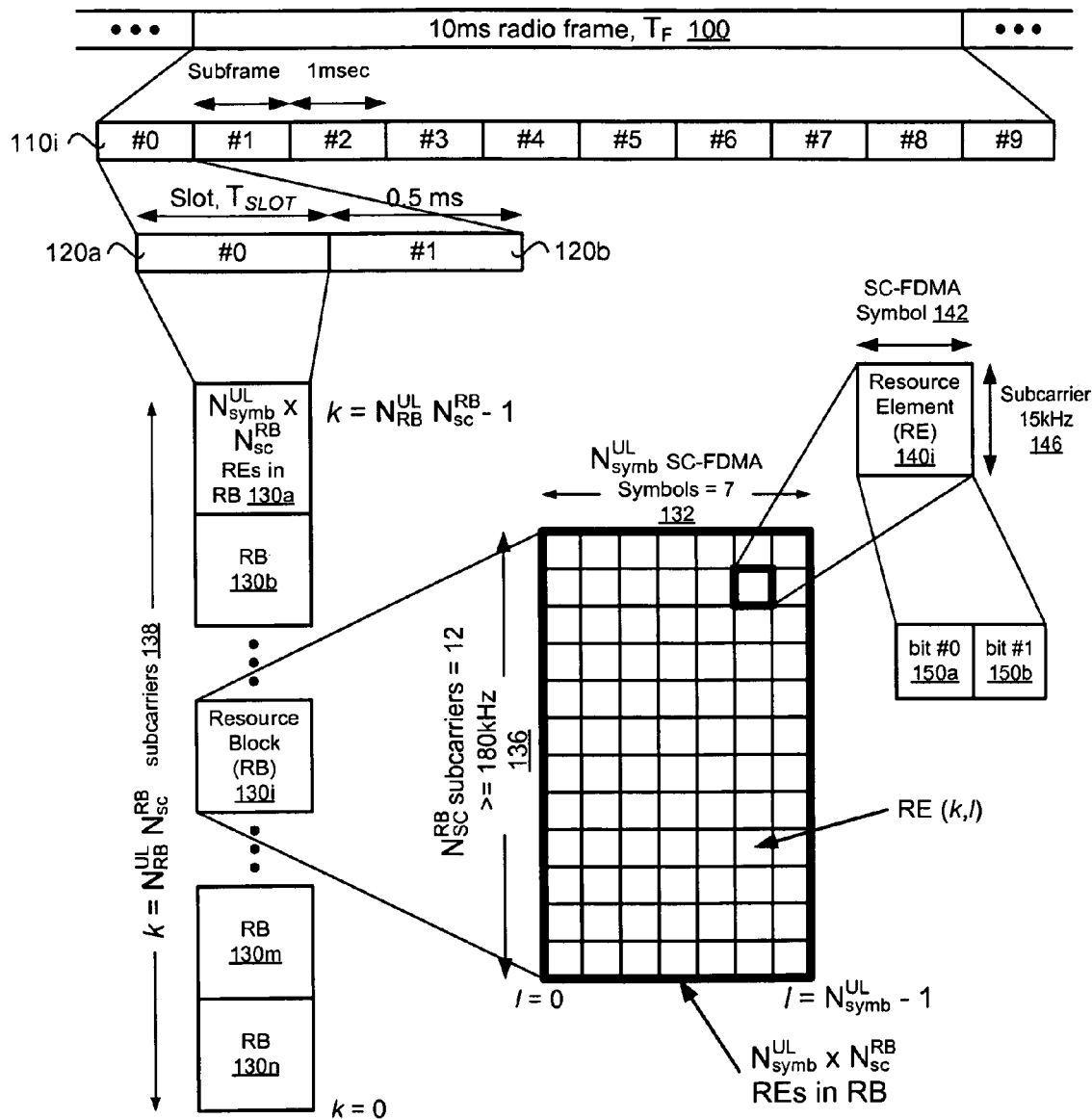
FIG. 5 illustrates a block diagram of uplink radio frame resources (e.g., an uplink resource grid) in accordance with an example.

A component carrier can be used to carry channel information via a radio frame structure transmitted on the physical (PHY) layer in a downlink transmission between a node (e.g., eNodeB) and the wireless device (e.g., UE) using a generic long term evolution (LTE) frame structure, as illustrated in FIG. 4. In another example, a component carrier can be used to carry channel information via a radio frame structure transmitted on the PHY layer in a uplink transmission between a node (e.g., eNodeB) and the wireless device (e.g., UE) using a generic long term evolution (LTE) frame structure, as illustrated in FIG. 5. While an LTE frame structure is illustrated, a frame structure for an IEEE 802.16 standard (WiMax), an IEEE 802.11 standard (WiFi), or another type of communication standard using SC-FDMA or OFDMA may also be used.

FIG. 4 illustrates a downlink radio frame structure type 2. In the example, a radio frame 400 of a signal used to transmit the data can be configured to have a duration, Tf, of 10 milliseconds (ms). Each radio frame can be segmented or divided into ten subframes 410$i$ that are each 1 ms long. Each subframe can be further subdivided into two slots 420$a$ and 420$b$, each with a duration, Tslot, of 0.5 ms. The first slot (#0) 420$a$ can include a legacy physical downlink control channel (PDCCH) 160 and/or a physical downlink shared channel (PDSCH) 466, and the second slot (#1) 420$b$ can include data transmitted using the PDSCH.

Each slot for a component carrier (CC) used by the node and the wireless device can include multiple resource blocks (RBs) 430$a$, 430$b$, 430$i$, 430$m$, and 430$n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first OFDM symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 430$i$ can include 12-15 kHz subcarriers 436 (on the frequency axis) and 6 or 7 orthogonal frequency-division multiplexing (OFDM) symbols 432 (on the time axis) per slot. The RB can use seven OFDM symbols if a short or normal cyclic prefix (CP) is employed. The RB can use six OFDM symbols if an extended cyclic prefix (CP) is used. The resource block can be mapped to 84 resource elements (REs) 440$i$ using short or normal cyclic prefixing, or the resource block can be mapped to 72 REs (not shown) using extended cyclic prefixing. The RE can be a unit of one OFDM symbol 442 by one subcarrier (i.e., 15 kHz) 446.

Each RE can transmit two bits 450$a$ and 450$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Communication of data on a physical downlink shared channel (PDSCH) can be controlled via a control channel, referred to as a physical downlink control channel (PDCCH). The PDCCH can be used for downlink (DL) and uplink (UL) resource assignments (e.g., UL grants), transmit power commands, and paging indicators. The data carried on the PDCCH can be referred to as downlink control information (DCI).

The DCI has various formats to define resource allocations. For example in LTE, DCI format 0 can be used for the transmission of uplink shared channel (UL-SCH) allocation or assignments (e.g., UL grants), which can be used for scheduling of PUSCH and transmit power control (TPC) command for UL power control. DCI format 1 can be used for the transmission of downlink shared channel (DL-SCH) assignments for single antenna operation, which can transmit PDSCH for single-input multiple-output (SIMO) operation. DCI format 1A can be used for a compact transmission of DL-SCH assignments for single antenna (e.g., SIMO) operation, allocation for SIMO operation or allocating a dedicated preample signature to a UE for random access, or UL power control. DCI format 1B can be used for compact scheduling or resource assignment with precoding information to support multiple-input multiple-output (MIMO) closed-loop (CL) single-rank transmission with possibly contiguous resource allocation. DCI format 1C can be for very compact scheduling of resource allocation for PDSCH to support downlink transmission of paging, random access channel (RACH) response, and dynamic broadcast control channel (BCCH) scheduling. DCI format 1C can be similar to DCI format 1B with additional power offset information. DCI format 2 can be for compact DL-SCH allocation and scheduling with precoding and power offset information used to support the transmission of DL-SCH assignments for MIMO operation, which can be used for CL DL MIMO and UL power control. DCI format 2A can be for compact DL-SCH allocation and scheduling with precoding and power offset information used to support the transmission of DL-SCH assignments for MIMO operation, which can be used for open loop (OL) DL MIMO and UL power control. DCI formats 2C and 2D can also be used for the transmission of DL-SCH assignments for MIMO operations. DCI format 3 can be used for the transmission of TPC commands for an uplink channel (e.g., PUCCH and PUSCH) with 2-bit power adjustments (for multiple UEs). DCI format 3A can be used for the transmission of TPC commands for an uplink channel (e.g., PUCCH and PUSCH) with single bit power adjustments (for multiple UEs). DCI formats used to grant PUSCH transmissions can be provided by DCI format 0 and DCI format 4, which can also be referred to as uplink DCI formats when common behavior is addressed.

The various scenarios for the downlink can also be reflected in different transmission modes (TMs). For example, in LTE, TM 1 can use a single transmit antenna; TM 2 can use transmit diversity; TM 3 can use open loop spatial multiplexing with cyclic delay diversity (CDD); TM 4 can use closed loop spatial multiplexing; TM 5 can use multi-user MIMO (MU-MIMO); TM 6 can use closed loop spatial multiplexing using a single transmission layer; TM 7 can use beamforming with UE-specific RS; TM 8 can use single or dual-layer beamforming with UE-specific RS; and TM 9 can use a multilayer transmission to support closed-loop single user MIMO (SU-MIMO) or carrier aggregation. In an example, TM 10 can be used for coordinated multipoint (CoMP) signaling, such as joint processing (JP), dynamic point selection (DPS), and/or coordinated scheduling/coordinated beamforming (CS/CB).

FIG. 5 illustrates an uplink radio frame structure. A similar structure can be used for a downlink radio frame structure using OFDMA (as shown in FIG. 4). In the example, a radio frame 100 of a signal used to transmit control information or data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. Each slot for a component carrier (CC) used by the wireless device and the node can include multiple resource blocks (RBs) 130$a$, 130$b$, 130$i$, 130$m$, and 130$n$ based on the CC frequency bandwidth. Each RB (physical RB or PRB) 130$i$ can include 12-15 kHz subcarriers 136 (on the frequency axis) and 6 or 7 SC-FDMA symbols 132 (on the time axis) per subcarrier. The RB can use seven SC-FDMA symbols if a short or normal cyclic prefix is employed. The RB can use six SC-FDMA symbols if an extended cyclic prefix is used. The resource block can be mapped to 84 resource elements (REs) 140$i$ using short or normal cyclic prefixing (CP), or the resource block can be mapped to 72 REs (not shown) using extended cyclic prefixing (CP). The RE can be a unit of one SC-FDMA symbol 142 by one subcarrier (i.e., 15 kHz) 146. Each RE can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for an uplink transmission from the wireless device to the node.

An uplink signal or channel can include data on a Physical Uplink Shared CHannel (PUSCH) or control information on a Physical Uplink Control CHannel (PUCCH). In LTE, the uplink physical channel (PUCCH) carrying uplink control information (UCI) can include channel state information (CSI) reports, Hybrid Automatic Repeat reQuest (HARQ) ACKnowledgment/Negative ACKnowledgment (ACK/NACK) and uplink scheduling requests (SR).

The wireless device (e.g., UE) can provide HARQ-ACK feedback for a PDSCH using a PUCCH. The PUCCH can support multiple formats (i.e., PUCCH format) with various modulation and coding schemes (MCS), as shown for LTE in Table 1. Similar information to Table 1 can be shown in 3GPP LTE standard Release 11 (e.g., V11.1.0 (2012-12)) Technical Specification (TS) 36.211 Table 5.4-1. For example, PUCCH format 3 can be used to convey a 48-bit HARQ-ACK, which can be used for carrier aggregation.

TABLE 1

| PUCCH format | Modulation scheme | Number of bits per subframe, $M_{bit}$ |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |
| 3 | QPSK | 48 |

Legacy LTE TDD can support asymmetric UL-DL allocations by providing seven different semi-statically configured uplink-downlink configurations. Table 2 illustrates seven UL-DL configurations used in LTE, where "D" represents a downlink subframe, "S" represents a special subframe, and "U" represents an uplink subframe. In an example, the special subframe can operate or be treated as a downlink subframe. Similar information to Table 2 can be shown in 3GPP LTE TS 36.211 Table 4.2-2.

TABLE 2

| Uplink-downlink configuration | Subframe number | | | | | | | | | |
|---|---|---|---|---|---|---|---|---|---|---|
| 0 | | | | | | | | | | |
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |

As illustrated by Table 2, UL-DL configuration 0 can include 6 uplink subframes in subframes 2, 3, 4, 7, 8, and 9, and 4 downlink and special subframes in subframes 0, 1, 5, and 6; and UL-DL configuration 5 can include one uplink subframe in subframe 2, and 9 downlink and special subframes in subframes 0, 1, and 3-9. Each uplink subframe n can be associated with a downlink subframe based on the uplink-downlink configuration, where each uplink subframe n can have a downlink association set index $K \in \{k_0, k_1, \ldots k_{M-1}\}$ where M is defined as the number of elements in set K, as illustrated by Table 3. Similar information to Table 3 can be shown in 3GPP LTE TS 36.213 Table 10.1.3.1-1.

TABLE 3

| UL-DL Configuration | Subframe n | | |
|---|---|---|---|
| | 2 | 3 | 7 |
| 0 | 6 | — | 6 |
| 1 | 7, 6 | 4 | 7, 6 |
| 2 | 8, 7, 4, 6 | — | 8, 7, 4, 6 |
| 3 | 7, 6, 11 | 6, 5 , 4 | — |
| 4 | 12, 8, 7, 11 | 6, 5, 4, 7 | — |
| 5 | 13, 12, 9, 8, 7, 5, 4, 11, 6 | — | — |
| 6 | 7 | 7 | 7 |

The Table 3 shows examples of downlink subframe bundling in an uplink subframe handling ACK/NACK feedback for certain downlink subframe(s). For example, in uplink-downlink configuration 4, uplink subframe 2 (subframe n) handles ACK/NACK feedback for downlink and special subframes which are {12, 8, 7, 11} subframes (subframes $k_m$)

earlier than uplink subframe 2 (i.e., downlink and special subframes {0, 4, 5, 1} (or downlink and special subframes n−$k_m$)) and M equals 4. Uplink subframe 3 (subframe n) handles ACK/NACK feedback for downlink subframes which are {6, 5, 4, 7} subframes (subframes $k_m$) earlier than uplink subframe 3 (i.e., downlink subframes {7, 8, 9, 6} (or downlink subframes n−$k_m$)) and M equals 4. For uplink-downlink configuration 5 uplink subframe 2, M equals 9. For uplink-downlink configuration 0, uplink subframe 2, M equals one, and uplink subframe 3, M equals zero. Depending on the uplink-downlink configuration one uplink subframe may be responsible for ACK/NACK feedback for one or multiple downlink subframes. In certain situations, even distribution between uplink subframe responsibility can be desired to reduce situations where one uplink subframe is responsible for ACK/NACK feedback for a large number of downlink and special subframes.

As an underlying requirement in some examples, cells of the network can change UL-DL (TDD) configurations synchronously in order to avoid the interference. However, such a requirement can constrain the traffic management capabilities in different cells of the network. The legacy LTE TDD set of configurations can provide DL subframe allocations in the range between 40% and 90%, as shown in Table 2. The UL and DL subframes allocation within a radio frame can be reconfigured through system information broadcast signaling (e.g., system information block [SIB]). Hence, the UL-DL allocation once configured can be expected to vary semi-statically.

A property of TDD is that a number of UL and DL subframes can be different as shown in Table 2 and often the number of DL subframes can be more than the number of UL subframes for a radio frame. In configurations where more DL subframes are used than UL subframes, multiple DL subframes can be associated with one single UL subframe for the transmission of a corresponding control signals. A configuration-specific HARQ-ACK timing relationship can be defined (e.g., 3GPP LTE standard Release 11 (e.g., V11.1.0 (2012-12)) TS 36.213 Table 10.1.3.1-1 or Table 3). If a UE is scheduled in a multiple of DL subframes, which can be associated with one UL subframe, the UE can transmit multiple ACK/NAK (ACK/NACK) bits in that UL subframe. A number of DL subframes with HARQ-ACK feedback on one single UL subframe can comprise one bundling window. In an example, HARQ-ACK bundling window may not be used for configuration 5, with 9 DL subframes.

An advantage of a Time Division Duplex (TDD) system can be a flexible resource utilization through different TDD configurations to better match the uplink and downlink traffic characteristics of the cell. By configuring different TDD configurations, the ratio between available UpLink (UL) and Downlink (DL) resources can range from 3UL:2DL (6UL:4DL) to 1UL:9DL. In legacy LTE TDD (e.g., LTE Release 10 (Rel-10) specification), only the aggregation of TDD Component Carriers (CCs) of a same UL-DL configuration may be defined and supported. While the same UL-DL configuration can simplify a design and operation of CC, the same UL-DL configuration can also impose some limitations.

In an example, inter-band carrier aggregation (CA) for a TDD system with different uplink-downlink configurations on different bands can be supported. For instance, more than one TDD carrier can be deployed by a single TDD operator and the carriers can be aggregated at a single base station (e.g., node). Besides, a separation between two carrier frequencies can be large enough to avoid UL-DL interference from a same device. Some of the benefits of inter-band CA with different TDD configurations on different bands can be include (1) legacy system co-existence, (2) heterogeneous network (HetNet) support, (3) aggregation of traffic-dependent carriers, (4) flexible configuration (e,g., more UL subframe in lower bands for better coverage, and more DL subframes in higher bands), and (5) higher peak rate.

Supporting Inter-band TDD Carrier Aggregation (CA) with different uplink-downlink configurations can be used to aggregate component carriers (CC) with different DL/UL configurations. To provide high peak data rate enhancement benefits to both full- and half-duplex UEs, HARQ (Hybrid Automatic Repeat reQuest) ACK/NACK feedback for downlink (DL) data may use a PUCCH only transmitted on Primary Cell (PCell), use legacy HARQ-ACK timing for PCell PDSCH by following a PCell SIB type 1 (SIB 1) UL-DL configuration, and use HARQ-ACK timing for the PDSCH of a Secondary Cell (SCell) following a specific reference UL-DL configuration (e.g., PCell and SCell UL-DL configuration) as shown in Table 4 illustrated in FIG. 6. For example, HARQ-ACK timing of the PDSCH on the PCell can follow the PCell SIB 1 legacy UL/DL configuration. For the PDSCH transmitted on the SCell, the HARQ timing can follow reference legacy UL/DL configuration as shown in Table 4.

Interband TDD CA with different UL-DL configurations in different bands can be supported. For example, an SCell PDSCH HARQ reference timing can be determined from a PCell UL-DL configuration and a SCell UL-DL configuration, as shown in Table 4 illustrated in FIG. 6. Table 4 (i.e., FIG. 6) illustrates the UL-DL configuration number of PDSCH HARQ-ACK timing reference for SCell. A HARQ-ACK timing of PCell PDSCH, the scheduling timing of PCell PUSCH, the HARQ timing of PCell PUSCH can use the PCell SIB 1 configuration. A UE can be configured with PUCCH format 3 for HARQ-ACK transmission and self-carrier scheduling for TDD inter-band carrier aggregation (CA) with different UL-DL configurations on different bands.

In Time-Division Long-Term Evolution (TD-LTE) system (also referred to as LTE Time-Division Duplex (LTE TDD) system), the HARQ-Acknowledgement (HARQ-ACK) for downlink data can be either transmitted on PUCCH channel or piggybacked on uplink PUSCH data prior to discrete Fourier transform-spreading (DFTS) in order to preserve an uplink single-carrier low-cubic metric property. When HARQ-ACK is to be transmitted in a subframe in which the UE has been allocated transmission resources for the PUSCH, HARQ-ACK resources can be mapped to SC-FDMA symbols by puncturing the PUSCH data resource elements (RE). Such PUSCH puncturing can cause PUSCH performance degradation, especially when the puncture is excessive. Therefore, PUSCH performance can be improved, if PUSCH REs punctured by HARQ-ACK symbols is minimized. To reduce PUSCH REs puncturing by HARQ-ACK symbols, 2-bits Downlink Assignment Index (DAI) in downlink control information (DCI) format 0/4, $V_{DAI}^{UL}$, can be used for TDD HARQ-ACK bundling or HARQ-ACK multiplexing to indicate the total number of DL assignments in a DL subframe bundling window. For example, assuming the bundling window size is M, as defined in Table 3, $V_{DAI}^{UL}$ HARQ-ACK bits, instead of M bits, can be fedback to eNB if a PUSCH transmission is adjusted based on a detected PDCCH with an uplink DCI format (e.g., DCI format 0 or 4), so the un-needed (M−$V_{DAI}^{UL}$) HARQ-ACK bits corresponding to the un-scheduled DL subframes by eNB are consequently reduced. The value $V_{DAI}^{UL}$ can include all PDSCH transmission with and without corresponding PDCCH within all the subframe(s) n−k, as defined in Table 3.

In coding theory, puncturing is the process of removing some of the parity bits after encoding with an error-correction code. Puncturing can have the same effect as encoding with an error-correction code with a higher rate (e.g., modulation and coding scheme (MCS)), or less redundancy. With puncturing a same decoder can be used regardless of how many bits have been punctured, thus puncturing can considerably increase the flexibility of a system without significantly increasing the system's complexity.

The DAI is a field in the downlink resource grant signaled to a UE, indicating how many subframes in a previous time window have contained transmissions to that UE. DAI can be applicable only when LTE is operated in TDD mode, and can enable the UE to determine whether the UE has received all the downlink transport blocks for which the UE transmits a combined ACK/NACK. For instance, the TDD configuration 1 with a dynamic 80-90% DL ratio can use a 2-bit DAI to indicate subframes 3 and 8.

If carrier aggregation(CA) is configured for UE in a legacy TD-LTE system (e.g., LTE release 10), the HARQ-ACK codebook size (in a case of piggybacking on PUSCH) can be determined by a number of configured CCs, the CCs' configured transmission mode, and a number of downlink subframes in the bundled window. When TDD UL-DL configuration 1-6 is used and PUCCH format 3 is configured for transmission of the HARQ-ACK, the HARK-ACK codebook size in PUSCH can be represented by Equation 1:

$$n_{HARQ} = B_c^{DL}(C+C_2) \quad \text{[Equation 1]},$$

where C is the number of downlink CCs configured; $C_2$ is the number of downlink CCs with configured transmission mode enabling the reception of two transport blocks (TB) (if spatial bundling is not employed), otherwise $C_2=0$; $B_c^{DL}$ is the number of downlink subframes for which UE needs to feedback HARQ-ACK bits for the c-th serving cell, and c≥0.

For TDD UL-DL configuration 1, 2, 3, 4 and 6, the UE can assume that $B_c^{DL}$ on PUSCH subframe n is represented by Equation 2. Equation 2 may not apply to UL-DL configurations 0 and 5 because UL-DL configuration 0 may not transmit a value $W_{DAI}^{UL}$, and UL-DL configuration 5 may not use a HARQ-ACK bundling window with 9 DL subframes (as previously discussed).

$$B_c^{DL} = W_{DAI}^{UL} \quad \text{[Equation 2]},$$

where $W_{DAI}^{UL}$ is determined by the downlink assignment index (DAI) in an uplink DCI format (e.g., DCI format 0/4) according to Table 6 in subframe n−k', where k' is defined in Table 5 for each serving cell. Similar information to Table 5 can be shown in 3GPP LTE TS 36.213 Table 7.3-Y. Similar information to Table 6 can be shown in 3GPP LTE TS 36.213 Table 7.3-Z.

Figure 7:
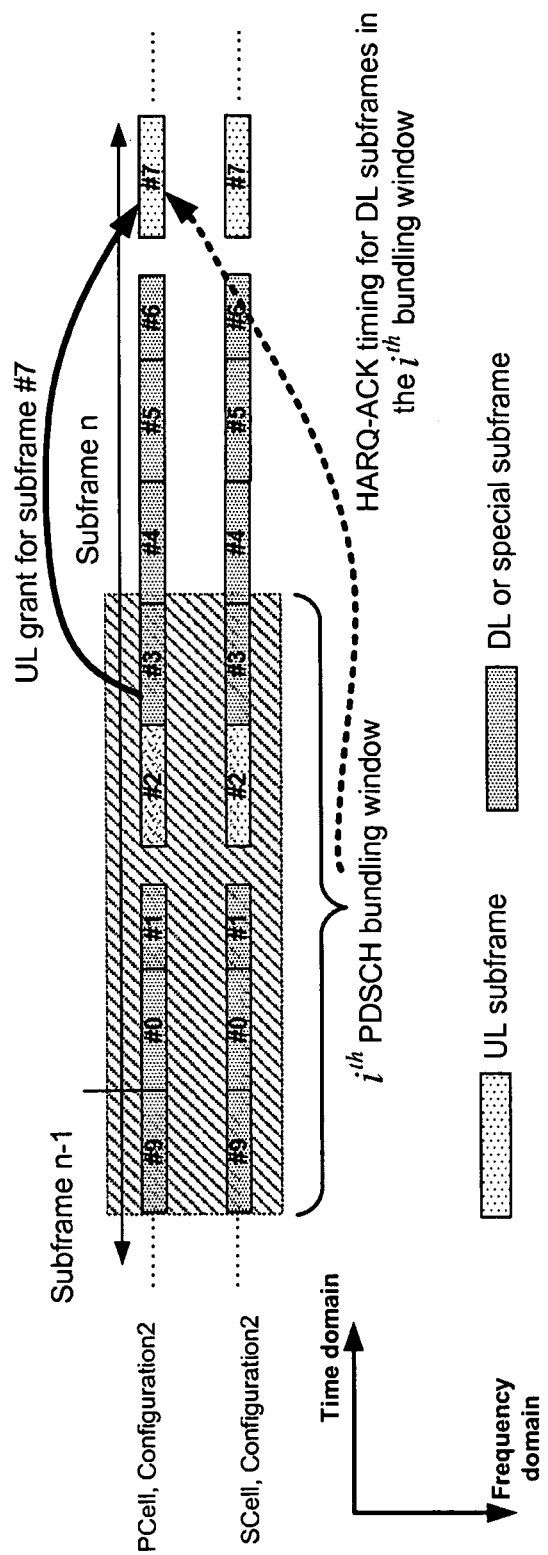
FIG. 7 illustrates a location of downlink subframe containing an UpLink (UL) grant within Physical Downlink Shared CHannel (PDSCH) bundling window in accordance with an example.

As defined in a legacy LTE system, the uplink DCI format (e.g., DCI format 0/4) for PUSCH scheduling can be transmitted in the last downlink subframe (subframe #3) within each bundling window, as shown in FIG. 7. When this occurs, the eNB can determine how many DL subframes have been transmitted within each serving cell c, so the eNB can directly set the value of $W_{DAI}^{UL}$ as a maximum number of $B_c^{DL}$, 0≤c<C for the configured CCs. Since $W_{DAI}^{UL}$ may be no larger than the bundling window size in the legacy LTE system, HARQ-ACK codebook size determined by $W_{DAI}^{UL}$ in the uplink DCI format can be equal to a minimum HARQ-ACK bits number. Using $W_{DAI}^{UL}$ to determine the HARQ-ACK codebook size can be a good tradeoff between HARQ-ACK overhead and PUSCH performance.

TABLE 5

| TDD UL/DL Configuration | subframe number n | | | | | | | | | |
|---|---|---|---|---|---|---|---|---|---|---|
| 1 | | | | | | | | | | |
| 2 | | | | | | | | | | |
| 3 | | | | | | | | | | |
| 4 | | | | | | | | | | |
| 5 | | | | | | | | | | |
| 6 | | | | | | | | | | |

TABLE 6

| DAI MSB, LSB | $W_{DAI}^{UL}$ |
|---|---|
| 0, 0 | 1 |
| 0, 1 | 2 |
| 1, 0 | 3 |
| 1, 1 | 4 |

FIG. 7 depicts a location of downlink subframe containing the UL grant within an $i^{th}$ PDSCH bundling window (e.g., HARQ bundling window), where a previous downlink subframes 9, 0, and 3, and special subframe 1 can comprise one bundling window on a PCell and SCell according a predefined HARQ-ACK timing relation for UL-DL configuration 2 for uplink subframe 7. Subframe 3 of the PCell can include the UL grant for subframe 7 for the PCell and the SCell. In an example, the HARQ-ACK for the PDSCH of the $i^{th}$ PDSCH bundling window can be provided by a UCI in the PUSCH.

Figure 8A:
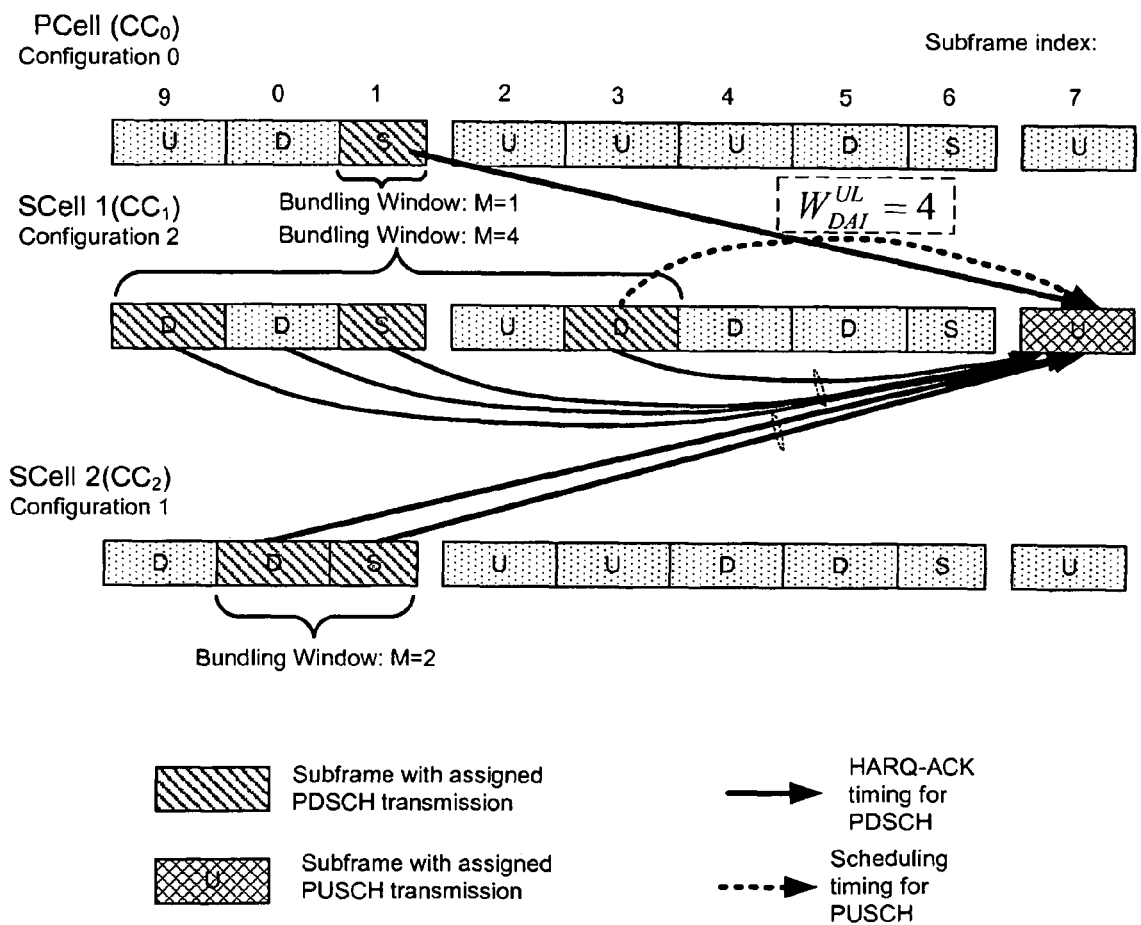
FIG. 8A illustrates a Hybrid Automatic Repeat reQuest-ACKnowledge (HARQ-ACK) codebook piggybacking on the Physical Uplink Shared CHannel (PUSCH) scheduled with transmission mode 4 (TM 4) in accordance with an example.
Figure 8B:
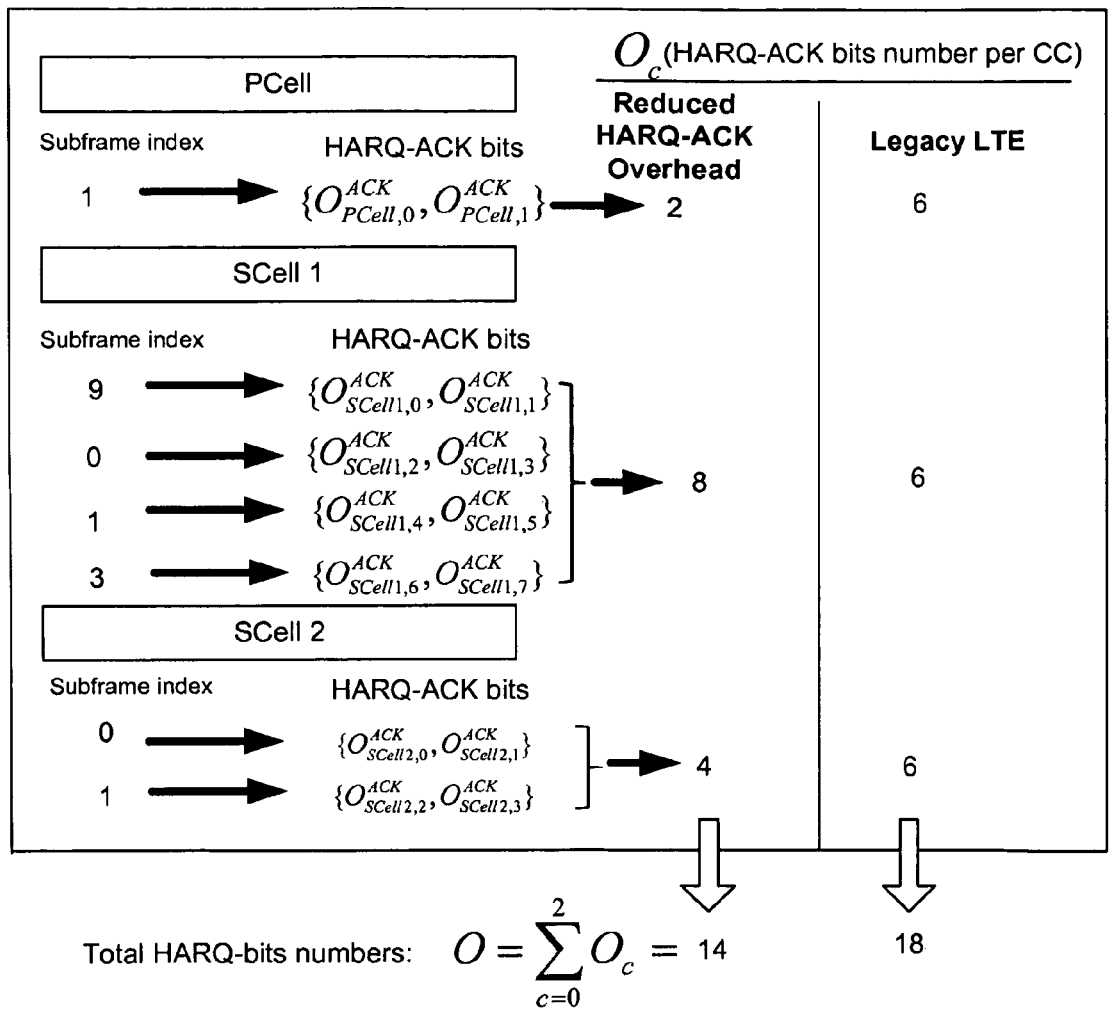
FIG. 8B illustrates a Hybrid Automatic Repeat reQuest-ACKnowledge (HARQ-ACK) bits generation for the Physical Uplink Shared CHannel (PUSCH) illustrated in FIG. 8A in accordance with an example.

Inter-band TDD carrier aggregation (CA) with different uplink-downlink configurations can also be supported, where component carriers (CC) with different DL/UL configurations can be aggregated, as illustrated in FIGS. 8A-B. For example, in order to provide high peak data rate enhancement to both full- and half-duplex UEs, Hybrid Automatic Repeat reQuest (HARQ) ACK/NACK feedback for downlink (DL) data can have various constraints. For instance, the PUCCH may only transmitted on Primary Cell (PCell), the HARQ-ACK timing of the PCell PDSCH can follow the PCell's own SIB1 UL-DL configuration, or for the PDSCH of SCell, the HARQ-ACK timing can follow a specific reference UL-DL configuration, such as Table 4 (FIG. 6).

According to the HARQ-ACK timing table (i.e., Table 4) for the SCell PDSCH (as shown in FIG. 6), the size of HARQ-ACK bundling window can be different between the PCell and the SCell. Based on this observation, if a UE configured with PUCCH format 3 for HARQ-ACK transmission, the HARQ-ACK transmission can follow a legacy design except for the following exception introducing Equation 3:

If the timing reference configuration is #{1, 2, 3, 4, 6}, for HARQ-ACK transmission in an UL subframe 'n' and on a PUSCH adjusted by an UL grant, the number of downlink subframes for which the UE can feedback HARQ-ACK bits for the c-th serving cell can be represented by Equation 3:

$$B_c^{DL} = \min(W_{DAI}^{UL}, M_c) \quad \text{[Equation 3]},$$

where $M_c$ represents the total number of subframes with PDSCH transmissions and with PDCCH indicating downlink semi-persistent scheduling (SPS) release to the corresponding UE within HARQ-ACK bundling window associated with UL subframe n for the c-th serving cell. Using the method implementing Equation 3 can effectively reduce the HARQ-ACK overhead for inter-band TDD CA in many cases. For instance, FIGS. 8A-8B illustrate an example, where the UE aggregates a total of three CCs with UL-DL configuration 0 in PCell, UL-DL configuration 2 in SCell1, and UL-DL configuration 1 in SCell2. Transmission mode 4 with two transport blocks (TB) enabled can be configured and spatial HARQ-ACK bundling may not be applied because the HARQ-ACK payload size is not greater than 20. The special subframe configuration of each CC can be configuration 3 with normal downlink CP. The eNB can transmit the downlink subframes at subframe 1 of PCell; subframes 9, 0, 1, and 3 of Scell1; and subframe 0 of SCell2. Additionally, the UE can receive the uplink grant for the PUSCH transmission for subframe 7. As a result, the total HARQ-ACK codebook size can be reduced from 18 to 14, as illustrated in FIG. 8B, which implies a reduction of HARQ-ACK overhead of up to 23%. As a consequence, the PUSCH performance and system throughput can be improved with little to no impact on HARQ-ACK performance (unlike puncturing). FIGS. 8A-B illustrate HARQ-ACK codebook piggybacking on the PUSCH scheduled with transmission mode 4. The total HARQ-ACK bit numbers (or HARQ-bit numbers) can be represented by 'O' or '$O^{ACK}$'. FIG. 8B can be generated using Tables 5 and 6, and Equations 1-3.

Figure 9:
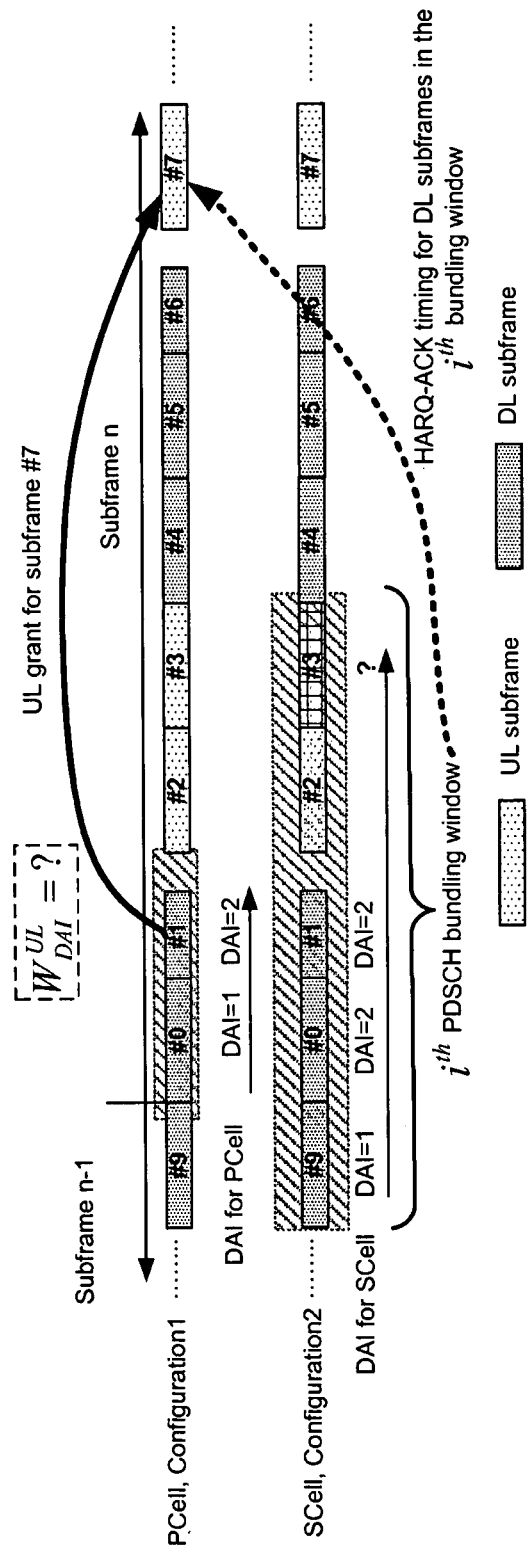
FIG. 9 illustrates a potential issue for Hybrid Automatic Repeat reQuest-ACKnowledge (HARQ-ACK) codebook determination for inter-band time division duplex (TDD) carrier aggregation (CA) (e.g., different UL-DL configurations) in accordance with an example.

From Equations 2 and 3, the HARQ-ACK codebook size reduction can depend on the $W_{DAI}^{UL}$ value. As previously stated, if an uplink DCI format (e.g., DCI format 0/4) for PUSCH scheduling is restricted to be transmitted at the last DL subframe within each bundling window, the value of $W_{DAI}^{UL}$ may be set by eNB according to the existing PDSCH scheduling information, which may not be complete in some inter-band TDD CA scenarios. By exploiting the timing relationship between the PUSCH scheduling and the last DL subframe within each bundling window, the HARQ-ACK codebook size can be minimized when the HARQ-ACK feedback piggybacked (e.g, transmitted) on the PUSCH. Unfortunately, some cases of inter-band TDD CA can exist when an uplink DCI format (e.g., DCI format 0/4) for PUSCH scheduling is transmitted in the DL subframe in the middle of bundling window, as illustrated in FIG. 9. FIG. 9 illustrates an example where the PCell is configured with TDD UL-DL configuration 1 and SCell is configured with TDD UL-DL configuration 2. PCell subframe 0 can have a DAI=1 and subframe 1 can have a DAI=2, while SCell subframe 9 can have a DAI=1 and subframes 0 and 1 can have a DAI=2 with subframe 3 having an unknown DAI. FIG. 9 depicts a potential issue for HARQ-ACK codebook determination for inter-band TDD CA. Since the PDSCH transmission in subframe #3 in SCell may not be predicted by eNB for $W_{DAI}^{UL}$ setting of the UL grant sent in subframe #1 of PCell (i.e., $W_{DAI}^{UL}$ sent in subframe #1 of PCell), a set of rules (e.g., modification of the calculation of the value $B_c^{DL}$) can be defined and provided to UE to avoid the HARQ-ACK codebook size ambiguity between UE and eNB.

For cases when PDSCH transmission in a HARQ bundling window occur after the transmission of a UL grant, as shown in FIG. 9, the HARQ-ACK bit generation method, as defined in Equation 3, may no longer be applicable and may not support this case. Because of the subsequent DL subframe (which may or may not be transmitted), which occurs after the DL subframe carrying the uplink DCI format (e.g., DCI format 0/4), such as subframe #3 of SCell in FIG. 9, the HARQ-ACK codebook size can be ambiguous. Therefore, the subsequent DL subframe may not be included in the $W_{DAI}^{UL}$ value when the uplink DCI format is transmitted. The technology (e.g., methods, computer circuitry, devices, processors, and UEs) described herein can be used to set the $W_{DAI}^{UL}$ value to minimize the HARQ-ACK codebook size and while still avoiding the ambiguity on HARQ-ACK codebook size between eNB and UE. The technology can be used for minimizing the HARQ-ACK book size for various cases.

Figure 10:
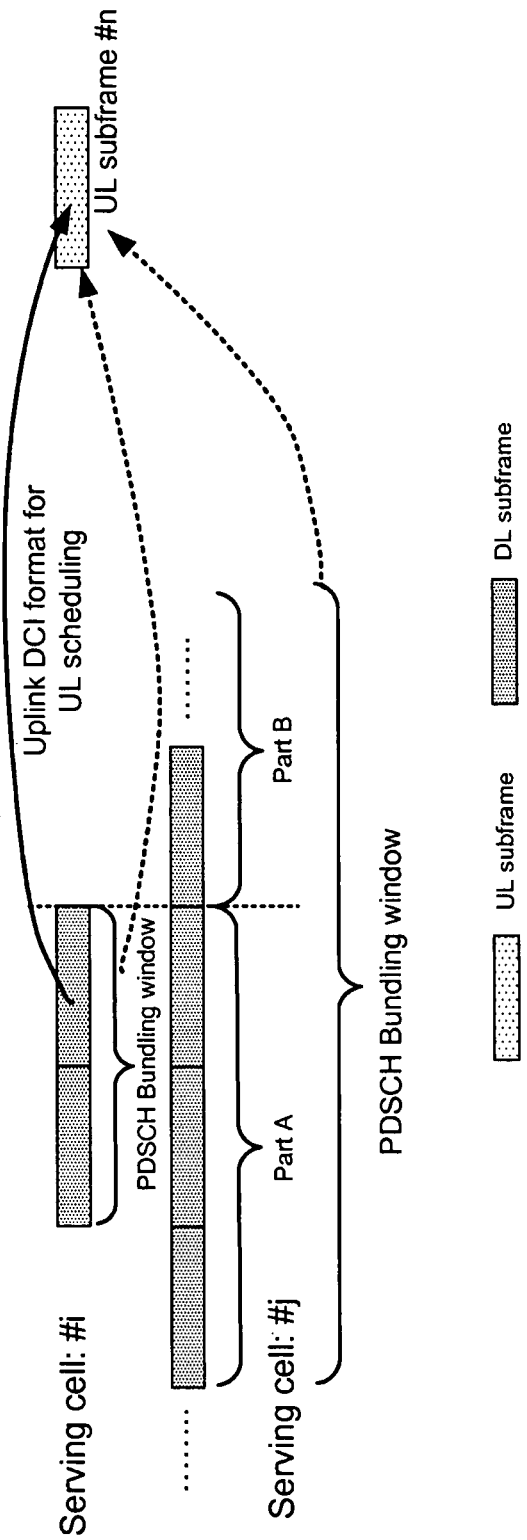
FIG. 10 illustrates a Hybrid Automatic Repeat reQuest-ACKnowledge (HARQ-ACK) feedback model for inter-band time division duplex (TDD) carrier aggregation (CA) in accordance with an example.

In an example, a HARQ-ACK codebook size can be determined under a timing triggering condition when a DL subframe occurs after the DL DCI transmission with an uplink DCI format (e.g., DCI format 0/4). Such DL subframe may not be predicted in advance by the eNB, therefore the subsequent PDSCH subframe may not be counted for the $W_{DAI}^{UL}$ value setting. Consequently, the $W_{DAI}^{UL}$ may not be applicable for the entire HARQ bundling window and may cause a discrepancy on the HARQ-ACK codebook size between eNB and UE side, since UE may generate a legacy HARQ-ACK bits number solely depends on the $W_{DAI}^{UL}$ value in the uplink grant DCI (e.g., DCI format 0/4) detected. FIG. 10 illustrates a HARQ-ACK feedback model for an inter-band TDD CA system, where the subsequent PDSCH subframe (e.g., Part B) occurs after an uplink grant DCI.

Equation 3 may lead to ambiguity for HARQ-ACK generation and may not be applicable for the cases illustrated by FIGS. 9-10. The UE can make determinations and modifications to properly utilize the $W_{DAI}^{UL}$ value to minimize the HARQ-ACK codebook size without ambiguity. For example, the bundling window can be divided into two parts (e.g., parts A and B), as shown in FIG. 10. For part A, the HARQ-ACK codebook overhead can be properly reduced according to the $W_{DAI}^{UL}$ in the uplink DCI format (e.g., DCI format 0/4). While for part B, if existing (e.g., a subsequent PDSCH subframe occurs after an uplink grant DCI), the subsequent PDSCH subframe can generate HARQ-ACK bits associated with each downlink subframe.

Additional details are provided of the examples related to Parts A and B. By reusing an existing HARQ-ACK bundling window definition, a bundling window can include a set of DL subframes associated with one UL subframe, which can carry the HARQ-ACK feedbacks as defined in Table 3. FIG. 10 can illustrate HARQ-ACK codebook size determination to address the issue depicted in FIG. 9. In FIG. 10, the PDSCH bundling window of serving cell 'j', which is associated with UL subframe 'n', can be further divided into two parts: part A and B, according to the downlink subframe position relative to the DL subframe carrying the UL grant transmitted on serving cell 'i' where i≠j. The part A within a bundling window on serving cell 'c' can include $M_c^A$ number of DL subframes, and part B within a bundling window on serving cell 'c', if existed, can include $M_c^B$ number of DL subframes, and $M_c = M_c^A + M_c^B$. As shown in FIG. 10, the characteristic of the DL subframe in part B can be that these subframes are transmitted later than the downlink subframe conveyed the UL grant for PUSCH scheduling on UL subframe #n. In some cases, $M_c^B$ can be equal to zero.

The HARQ-ACK codebook size can be expressed by Equation 4:

$$O^{ACK} = \sum_{c=0}^{N_{cells}^{DL}-1} (B_c^{DL} \times C_c^{DL})  \quad [\text{Equation 4}],$$

where $N_{cells}^{DL}$ is the number of configured cells, $C_c^{DL}=1$ if transmission mode configured in the c-th serving cell supports one transport block or spatial HARQ-ACK bundling is applied, otherwise $C_c^{DL}=2$ In an example, several different $B_c^{DL}$ determinations can be used corresponding to different TDD UL-DL configuration of serving cell 'i', which can be used for the case shown in FIG. 10 and when PUCCH format 3 is configured.

In a first case, when PUCCH format 3 is configured for transmission of HARQ-ACK, HARQ-ACK is transmitted on the PUSCH in the subframe n adjusted by a detected PDCCH with an uplink DCI format (e.g., DCI format 0/4), and the timing reference configuration of serving cell #i, on which UL grant is transmitted, is UL-DL configuration 0; the UE can assume $B_c^{DL}$ for any one serving cell 'c' on PUSCH subframe 'n' as represented by Equation 5:

$$B_c^{DL}=M_c \quad \text{[Equation 5]},$$

where $M_c$ is the number of elements in the set K (as defined in Table 3) associated with subframe 'n' for HARQ-ACK feedback and the set K does not include a special subframe of UL-DL configurations 0 and 5 with normal downlink CP or the set K does not include a special subframe of UL-DL configurations 0 and 4 with extended downlink CP. Otherwise, for PUCCH format 3 is configured for transmission of HARQ-ACK, HARQ-ACK is transmitted on the PUSCH in the subframe n adjusted by a detected PDCCH with an uplink DCI format (e.g., DCI format 0/4), and the timing reference configuration of serving cell #i, on which UL grant is transmitted, is UL-DL configuration 0. The UE can assume $B_c^{DL}$ for any one serving cell 'c' on PUSCH subframe 'n' as represented by Equation 6:

$$B_c^{DL}=M_c-1 \quad \text{[Equation 6]}.$$

In an example, equation 5 and 6 can be used when an uplink DCI format does not transmit a value $W_{DAI}^{UL}$ (e.g., UL-DL configuration 0). Equation 5 can be used when no PDSCH or no data (e.g., only PDCCH transmission) are transmitted in special frames (e.g., UL-DL configurations 0 and 5 with normal downlink CP, or UL-DL configurations 0 or 4 with extended downlink CP). Equation 6 can be used when PDSCH or data are transmitted in special frames.

In a second case (e.g., the timing reference configuration of serving cell #i is not a UL-DL configuration 0), first option, as illustrated by FIG. 10, where the HARQ-ACK transmission in an UL subframe 'n' and on PUSCH can be adjusted by an UL grant, the number of HARQ-ACK codebook size on PUSCH can be determined by Equation 7:

$$B_c^{DL} = \min\left(M_c^A, \ W_{DAI}^{UL} + 4\left\lceil\frac{U - W_{DAI}^{UL}}{4}\right\rceil\right) + M_c^B, \quad \text{[Equation 7]}$$

where U denotes the maximum value of $U_c$ among all the configured serving cells, $U_c$ is the total number of received PDSCHs and PDCCH indicating downlink SPS release in subframe n−k within part A on the c-th serving cell, k ∈ K defined in Table 3; and $W_{DAI}^{UL}$ is determined by the Downlink Assignment Index (DAI) in an uplink DCI format (e.g., DCI format 0/4) of serving cell in which UCI piggybacking on PUSCH, according to Table 6 in subframe n−k', where k' is defined in Table 5.

In the second case, the value of $W_{DAI}^{UL}$ may only count the DL subframes transmitted no later than the DL subframe containing the UL grant for UL subframe n. This assumption can be valid considering the eNB may not precisely determine the transmission condition of subsequent subframe in Part B of the bundling window at the instant in time that the UL grant for subframe 'n' is transmitted.

Figure 11:
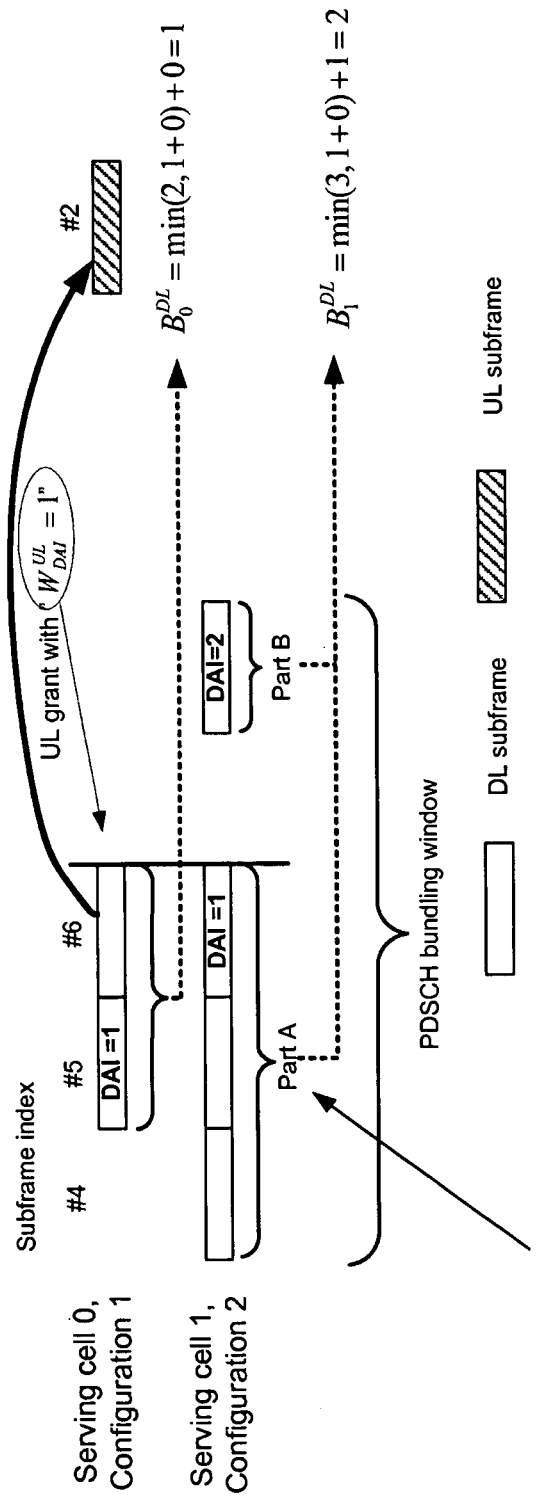
FIG. 11 illustrates a determination of a Hybrid Automatic Repeat reQuest-ACKnowledge (HARQ-ACK) codebook size on Physical Uplink Shared CHannel (PUSCH) in accordance with an example.

FIG. 11 provides an example of the HARQ-ACK codebook size determination for the second case. In FIG. 5, serving cell 0 can use configuration 1, and serving cell 1 can use configuration 2. Serving cell 0 subframe 5 can have a DAI=1, while serving cell 1 subframe 6 can have a DAI=1. The part B's PDSCH transmission (e.g., subframe 8 with DAI=2) may not be known by eNB scheduler, the UL grant with $W_{DAI}^{UL}=1$ can be transmitted on subframe #6 on serving cell 0 according to the PDSCH transmission status within part A of the PDSCH bundling window. Using Equations 4 and 7, the number of total HARQ-ACK bits generated can be 6 bits assuming transmission mode 4 with two transport blocks (TBs) configured. The 6 HARQ-ACK bits generated by the technology herein reduces the HARQ-ACK codebook size relative to the 8 HARQ-ACK bits used to feedback HARQ-ACK with a legacy system or design.

In a second case (e.g., the timing reference configuration of serving cell #i is not a UL-DL configuration 0), second option, the eNB can take the DL subframes of part B into consideration when determining the value of $W_{DAI}^{UL}$ in UL grant without a definitive determination of the subsequent PDSCH subframes in the HARQ bundling window by padding bits for the potential of additional PDSCH subframes. However, second case, second option can increase the HARQ-ACK overhead. For instance, as shown by the example in FIG. 11, the value of $W_{DAI}^{UL}$ can be set as $W_{DAI}^{UL}=2$, instead of $W_{DAI}^{UL}=1$, in order to include part B. Consequently, the number of HARQ-ACK bits increases from 6 to 8 (as illustrated in FIG. 11) when two CCs are configured. In another example using the illustration of FIG. 11, the number of additional HARQ-ACK bits can be considerably increased as the number of configured CCs is increased.

Figure 12:
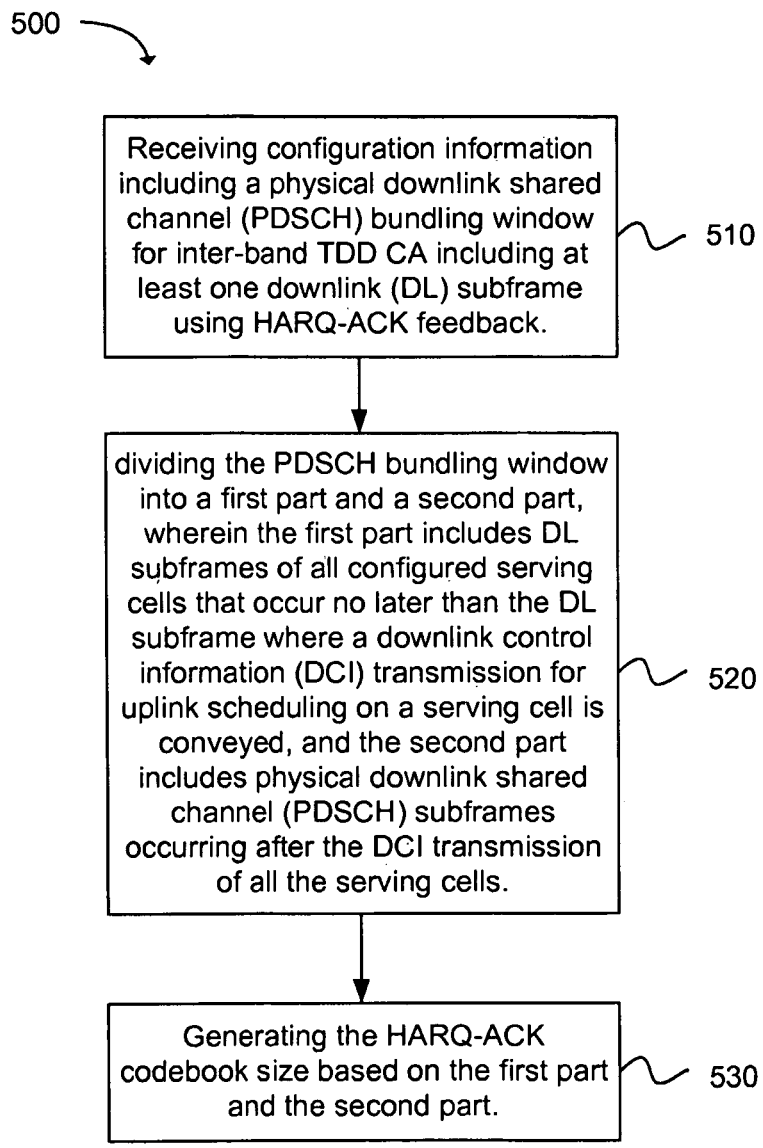
FIG. 12 depicts a flow chart of a method for Hybrid Automatic Repeat reQuest-ACKnowledge (HARQ-ACK) codebook size generation for inter-band time division duplex (TDD) carrier aggregation (CA) at a user equipment (UE) in accordance with an example.

Another example provides a method 500 for Hybrid Automatic Repeat reQuest-ACKnowledge (HARQ-ACK) codebook size generation for inter-band time division duplex (TDD) carrier aggregation (CA) at a user equipment (UE), as shown in the flow chart in FIG. 12. The method may be executed as instructions on a machine, computer circuitry, or a processor for the UE, where the instructions are included on at least one computer readable medium or one non-transitory machine readable storage medium. The method includes the operation of receiving configuration information including a physical downlink shared channel (PDSCH) bundling window for inter-band TDD CA including at least one downlink (DL) subframe using HARQ-ACK feedback, as in block 510. The operation of dividing the PDSCH bundling window into a first part and a second part, wherein the first part includes DL subframes of all configured serving cells that occur no later than the DL subframe where a downlink control information (DCI) transmission for uplink scheduling on a serving cell is conveyed, and the second part includes physical downlink shared channel (PDSCH) subframes occurring after the DCI transmission of all the serving cells follows, as in block 520. The next operation of the method can be generating the HARQ-ACK codebook size based on the first part and the second part, as in block 530.

In an example, the HARQ-ACK codebook size on a physical uplink shared channel (PUSCH) can be represented by $O^{ACK}=\sum_{c=0}^{N_{cells}^{DL}-1}(B_c^{DL} \times C_c^{DL})$, where $N_{cells}^{DL}$ is the number of configured cells, $B_c^{DL}$ is the number of downlink subframes for which the UE needs to feedback HARQ-ACK bits for the c-th serving cell, c is a non-negative integer, and $C_c^{DL}=1$ if a transmission mode configured in the c-th serving cell supports one transport block (TB) or spatial HARQ-ACK bundling is applied, otherwise $C_c^{DL}=2$ In a configuration, $$B_c^{DL} = \min\left(M_c^A, \ W_{DAI}^{UL} + 4\left\lceil\frac{U - W_{DAI}^{UL}}{4}\right\rceil\right) + M_c^B$$

when the DCI transmission includes a $W_{DAI}^{UL}$ value, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$ is determined by a downlink assignment index (DAI) in a DCI format where uplink control information (UCI) is transmitted on PUSCH according to a Table 7.3-Z of the TS 36.213 in subframe n−k', where k' is defined in the Table 7.3-Y of TS 36.213.

In another configuration, $$B_c^{DL} = \min\left(M_c^A, W_{DAI}^{UL} + 4\left\lceil \frac{U - W_{DAI}^{UL}}{4} \right\rceil\right) + M_c^B$$

when the DCI transmission includes a $W_{DAI}^{UL}$ value, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$=2.

In still another configuration, $B_c^{DL}=M_c$ when the DCI transmission does not include a $W_{DAI}^{UL}$ value, where $M_c=M_c^A+M_c^B$ is a number of elements in the set k∈ K as defined in a Table 10.1.3.1-1 in a Third Generation Partnership Project (3GPP) Long Term Evolution (LTE) standard Release 11 Technical Specification (TS) 36.213 associated with subframe 'n' for HARQ-ACK feedback, and the set K does not include a PDSCH, $M_c^A$ is a number of DL subframes in a first part, and $M_c^B$ is a number of DL subframes in a second part. Otherwise, $B_c^{DL}=M_c-1$ when the DCI transmission does not include a $W_{DAI}^{UL}$ value, and where the set K does include does include a PDSCH.

In another example, the method can further include receiving an uplink grant in a DCI transmission including downlink assignment index (DAI) information in a value $W_{DAI}^{UL}$ for the first part, wherein the DCI transmission is transmitted with a DCI format used for uplink grants. In another configuration, the method can further include transmitting HARQ-ACK feedback for PDSCH subframes of the HARQ bundling window with the calculated HARQ-ACK codebook size in uplink control information (UCI) on physical uplink shared channel (PUSCH).

In another configuration, the method includes the operation of receiving configuration information including a physical downlink shared channel (PDSCH) bundling window for inter-band TDD CA including at least one downlink (DL) subframe using HARQ-ACK feedback. The operation of triggering a division of the PDSCH bundling window into a first part and a second part when a PDSCH subframe in the PDSCH bundling window is transmitted after a downlink control information (DCI) transmission of a serving cell for an uplink grant, wherein the first part is associated with the DCI transmission of the serving cell for the uplink grant, and the second part represents HARQ-ACK feedback for PDSCH subframes occurring after the DCI transmission follows. The next operation of the method can be generating the HARQ-ACK codebook size based on the first part and the second part.

Figure 13:
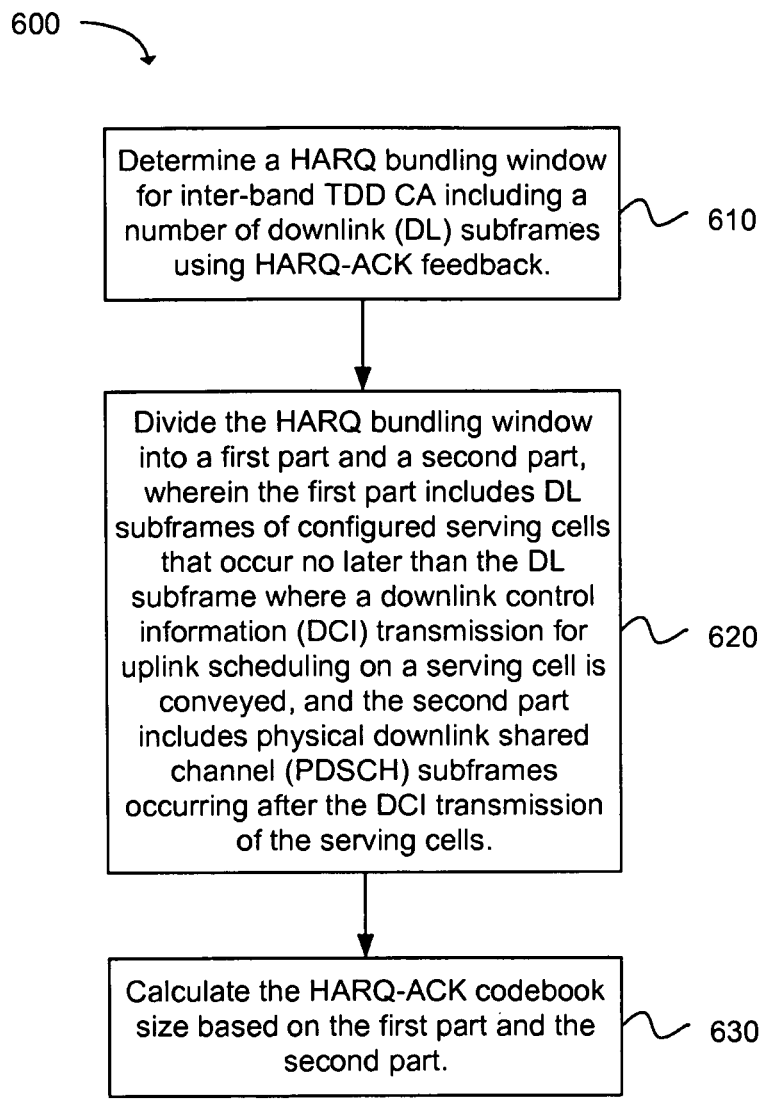
FIG. 13 depicts functionality of computer circuitry of a user equipment (UE) operable to determine a Hybrid Automatic Repeat reQuest-ACKnowledge (HARQ-ACK) codebook size for inter-band time division duplex (TDD) carrier aggregation (CA) in accordance with an example.

Another example provides functionality 600 of computer circuitry on a user equipment (UE) operable to determine a Hybrid Automatic Repeat reQuest-ACKnowledge (HARQ-ACK) codebook size for inter-band time division duplex (TDD) carrier aggregation (CA), as shown in the flow chart in FIG. 13. The functionality may be implemented as a method or the functionality may be executed as instructions on a machine, where the instructions are included on at least one computer readable medium or one non-transitory machine readable storage medium. The computer circuitry can be configured to determine a HARQ bundling window for inter-band TDD CA including a number of downlink (DL) subframes using HARQ-ACK feedback, as in block 610. The computer circuitry can be further configured to divide the HARQ bundling window into a first part and a second part, wherein the first part includes DL subframes of configured serving cells that occur no later than the DL subframe where a downlink control information (DCI) transmission for uplink scheduling on a serving cell is conveyed, and the second part includes physical downlink shared channel (PDSCH) subframes occurring after the DCI transmission of the serving cells, as in block 620. The computer circuitry can also be configured to calculate the HARQ-ACK codebook size based on the first part and the second part, as in block 630.

In an example, the HARQ-ACK codebook size on a physical uplink shared channel (PUSCH) can be represented by $O^{ACK}=\Sigma_{c=0}^{N_{cells}^{DL}-1}(B_c^{DL} \times C_c^{DL})$, where $N_{cells}^{DL}$ is the number of configured cells, $B_c^{DL}$ is the number of downlink subframes for which the UE needs to feedback HARQ-ACK bits for the c-th serving cell, c is a non-negative integer, and $C_c^{DL}=1$ if a transmission mode configured in the c-th serving cell supports one transport block (TB) or spatial HARQ-ACK bundling is applied, otherwise $C_c^{DL}=2$.

In a configuration, $$B_c^{DL} = \min\left(M_c^A, W_{DAI}^{UL} + 4\left\lceil \frac{U - W_{DAI}^{UL}}{4} \right\rceil\right) + M_c^B$$

when a serving cell carrying the uplink grant is not an uplink-downlink (UL-DL) configuration 0, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$ is determined by a downlink assignment index (DAI) in a DCI format 0 or 4 of the serving cell in which uplink control information (UCI) is transmitted on PUSCH according to a Table 7.3-Z of the TS 36.213 in subframe n−k', where k' is defined in the Table 7.3-Y of TS 36.213.

In another configuration, $$B_c^{DL} = \min\left(M_c^A, W_{DAI}^{UL} + 4\left\lceil \frac{U - W_{DAI}^{UL}}{4} \right\rceil\right) + M_c^B$$

when a serving cell carrying the uplink grant is not uplink-downlink (UL-DL) configuration 0, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}=2$.

In still another configuration, $B_c^{DL}=M_c$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where $M_c$ is a number of elements in the set k∈ K as defined in a Table 10.1.3.1-1 in a Third Generation Partnership Project (3GPP) Long Term Evolution (LTE) standard Release 11 Technical Specification (TS) 36.213 associated with subframe 'n' for HARQ-ACK feedback, and the set K does not include a special subframe of UL-DL configurations 0 and 5 with normal downlink cyclic prefixing (CP) and the set K does not include a special subframe of UL-DL configurations 0 and 4 with extended downlink CP. Otherwise, $B_c^{DL}=M_c-1$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where the set K does include a special subframe of UL-DL configurations 0 or 5 with normal downlink cyclic prefixing (CP) or the set K does include a special subframe of UL-DL configurations 0 or 4 with extended downlink CP.

In another example, the computer circuitry can be further configured to receive an uplink grant in a DCI transmission including downlink assignment index (DAI) information in a value $W_{DAI}^{UL}$ for the first part, where the DCI transmission is transmitted with an Long Term Evolution (LTE) DCI format 0 or a DCI format 4. In another configuration, the computer circuitry can be further configured to transmit HARQ-ACK codebook through the physical uplink shared channel (PUSCH) scheduled by the DCI for uplink scheduling.

In another example, the HARQ bundling window with HARQ bundling window size $M_c$ can include a set of DL subframes associated with one uplink (UL) subframe which carries the HARQ-ACK feedbacks as defined in a Table 10.1.3.1-1 in a Third Generation Partnership Project (3GPP) Long Term Evolution (LTE) standard Release 11 Technical Specification (TS) 36.213. In another configuration, a TDD configuration of a primary cell (PCell) in the inter-band TDD CA can differ from a TDD configuration of a secondary cell (SCell) in the inter-band TDD CA.

In another example, the computer circuitry can be configured to determine a HARQ bundling window for inter-band TDD CA including a number of downlink (DL) subframes using HARQ-ACK feedback. The computer circuitry can be further configured to divide the HARQ bundling window into a first part and a second part, wherein the first part is associated with a downlink control information (DCI) transmission of a serving cell for uplink scheduling, and the second part represents HARQ-ACK feedback for physical downlink shared channel (PDSCH) subframes occurring after the DCI transmission. The computer circuitry can also be configured to calculate the HARQ-ACK codebook size based on the first part and the second part.

Figure 14:
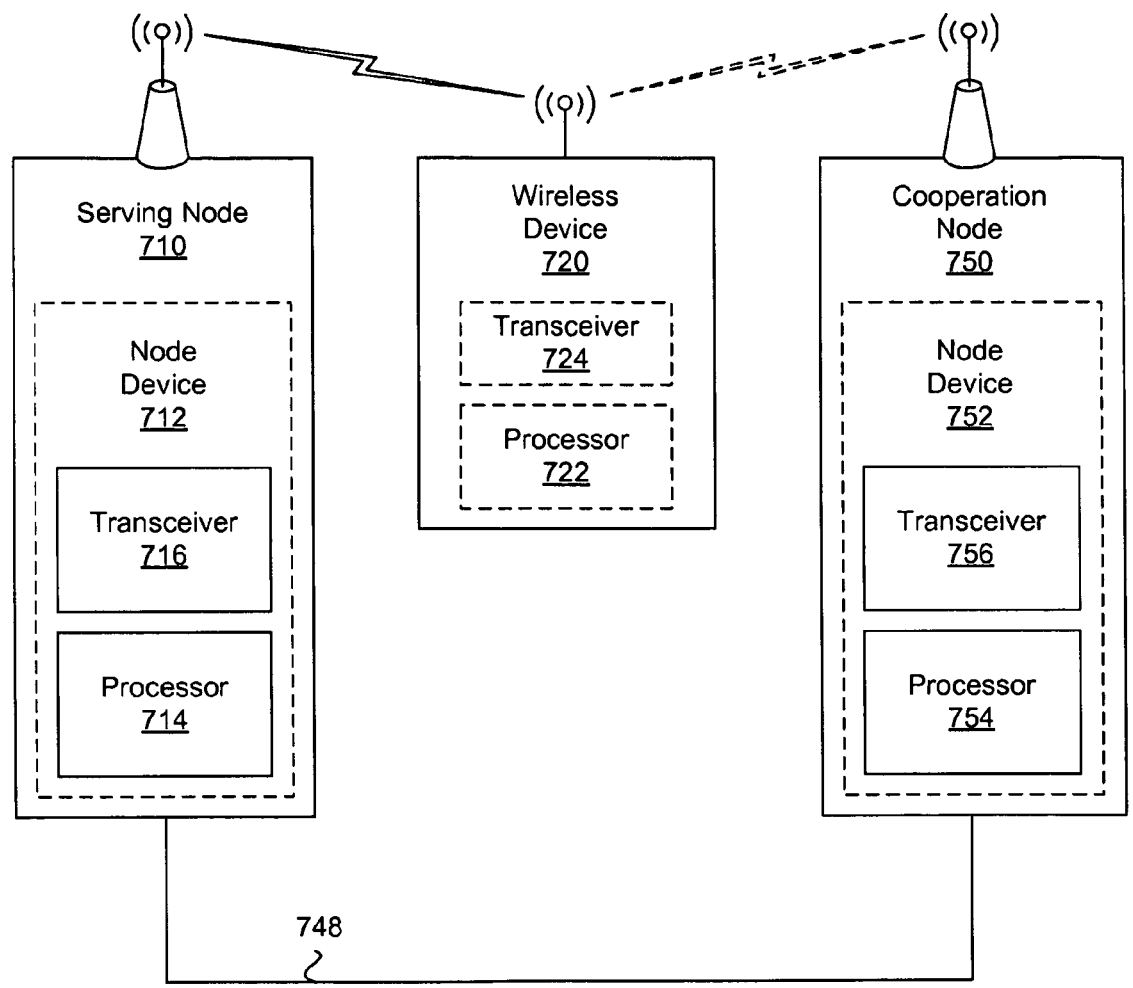
FIG. 14 illustrates a block diagram of a serving node, a coordination node, and wireless device (e.g., UE) in accordance with an example.

FIG. 14 illustrates an example node (e.g., serving node 710 and cooperation node 750), such as an eNB, and an example wireless device 720 (e.g., UE). The node can include a node device 712 and 752. The node device or the node can be configured to communicate with the wireless device. The node device, device at the node, or the node can be configured to communicate with other nodes via a backhaul link 748 (optical or wired link), such as an X2 application protocol (X2AP). The node device can include a processor 714 and 754 and a transceiver 716 and 756. The transceiver can be configured to transmit an uplink grant in a DCI transmission including downlink assignment index (DAI) information in a value $W_{DAI}^{UL}$ for the first part, where the DCI transmission is transmitted with a DCI format used for uplink grants. The transceiver can also be configured to receive HARQ-ACK codebook through the physical uplink shared channel (PUSCH) scheduled by the DCI for uplink scheduling. The transceiver 716 and 756 can be further configured to communicate with the coordination node via an X2 application protocol (X2AP). The processor can be further configured to generate downlink channels and receive and process uplink channels. The serving node can generate both the PCell and the SCell. The node (e.g., serving node 710 and cooperation node 750) can include a base station (BS), a Node B (NB), an evolved Node B (eNB), a baseband unit (BBU), a remote radio head (RRH), a remote radio equipment (RRE), a remote radio unit (RRU), or a central processing module (CPM).

The wireless device 720 (e.g., UE) can include a transceiver 724 and a processor 722. The wireless device (i.e., device) can be configured to calculate a Hybrid Automatic Repeat reQuest-ACKnowledge (HARQ-ACK) codebook size for time division duplex (TDD) carrier aggregation (CA), as described in 500 of FIG. 12 or 600 of FIG. 13.

In another example, processor 722 can be configured to: Determine a HARQ bundling window for inter-band TDD CA including a number of downlink (DL) subframes using HARQ-ACK feedback; partition the HARQ bundling window into a first part and a second part, where the first part includes DL subframes of configured serving cells that occur no later than the DL subframe where a downlink control information (DCI) transmission for uplink scheduling on a serving cell is conveyed, and the second part includes physical downlink shared channel (PDSCH) subframes occurring after the DCI transmission of the serving cells; and determine the HARQ-ACK codebook size based on the first part and the second part and a DCI format.

In an example, the HARQ-ACK codebook size on a physical uplink shared channel (PUSCH) can be represented by $O^{ACK}=\sum_{c=0}^{N_{cells}^{DL}-1}(B_c^{DL} \times C_c^{DL})$, where $N_{cells}^{DL}$ is the number of configured cells, $B_c^{DL}$ is the number of downlink subframes for which the UE needs to feedback HARQ-ACK bits for the c-th serving cell, c is a non-negative integer, and $C_c^{DL}=1$ if a transmission mode configured in the c-th serving cell supports one transport block (TB) or spatial HARQ-ACK bundling is applied, otherwise $C_c^{DL}=2$.

In a configuration, $$B_c^{DL} = \min\left(M_c^A, W_{DAI}^{UL} + 4\left\lceil \frac{U - W_{DAI}^{UL}}{4} \right\rceil\right) + M_c^B$$

when a serving cell carrying the uplink grant is not an uplink-downlink (UL-DL) configuration 0, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$ is determined by a downlink assignment index (DAD in a DCI format 0 or 4 of the serving cell in which uplink control information (UCI) is transmitted on PUSCH according to a Table 7.3-Z of the TS 36.213 in subframe n−k', where k' is defined in the Table 7.3-Y of TS 36.213.

In another configuration, $B_c^{DL}=M_c$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where $M_c$ is a number of elements in the set k∈ K as defined in a Table 10.1.3.1-1 in a Third Generation Partnership Project (3GPP) Long Term Evolution (LTE) standard Release 11 Technical Specification (TS) 36.213 associated with subframe 'n' for HARQ-ACK feedback, and the set K does not include a special subframe of UL-DL configurations 0 and 5 with normal downlink cyclic prefixing (CP) and the set K does not include a special subframe of UL-DL configurations 0 and 4 with extended downlink CP. Otherwise, $B_c^{DL}=M_c-1$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where the set K does include a special subframe of UL-DL configurations 0 or 5 with normal downlink cyclic prefixing (CP) or the set K does include a special subframe of UL-DL configurations 0 or 4 with extended downlink CP.

In another example, the transceiver 724 can be configured to receive an uplink grant in a DCI transmission including downlink assignment index (DAD information in a value $W_{DAI}^{UL}$ for the first part, where the DCI transmission is transmitted with a DCI format used for uplink grants. In another configuration, the transceiver can be further configured to transmit HARQ-ACK codebook through the physical uplink shared channel (PUSCH) scheduled by the DCI for uplink scheduling to a node.

In another example, processor 722 can be configured to: Determine a HARQ bundling window for inter-band TDD CA including a number of downlink (DL) subframes using HARQ-ACK feedback; partition the HARQ bundling window into a first part and a second part, where the first part represents HARQ-ACK feedback for physical downlink shared channel (PDSCH) subframes occurring prior or during a downlink control information (DCI) transmission of a serving cell for uplink scheduling, and the second part represents HARQ-ACK feedback for PDSCH subframes occurring after the DCI transmission; and determine the HARQ-ACK codebook size based on the first part and the second part and a DCI format.

Figure 15:
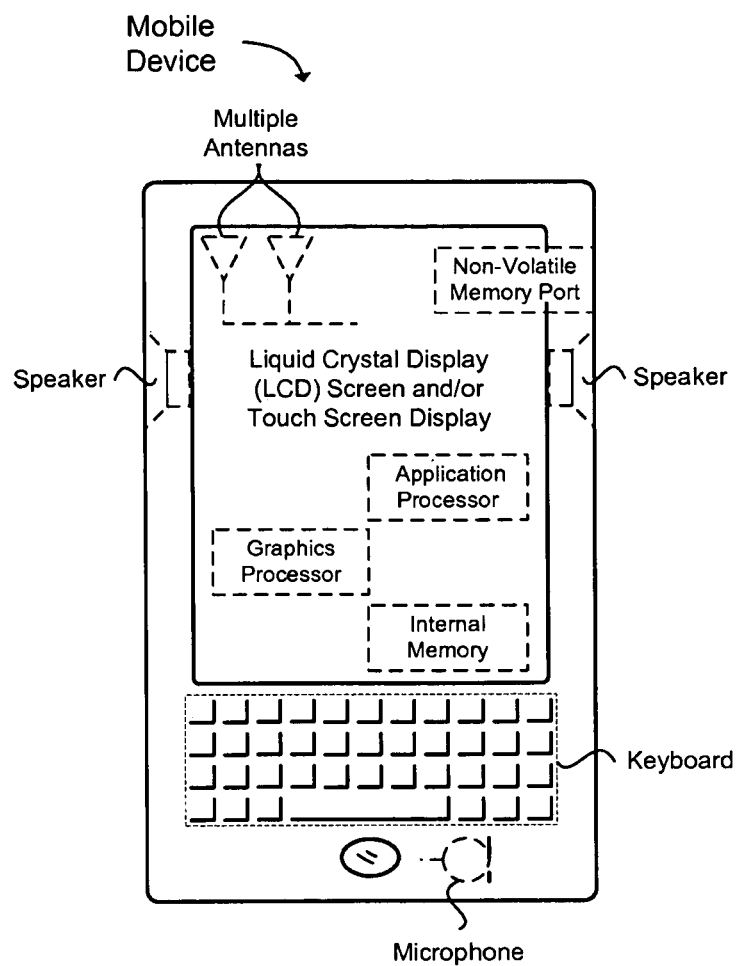
FIG. 15 illustrates a diagram of a wireless device (e.g., UE) in accordance with an example.

FIG. 15 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 15 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors or logic. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A user equipment (UE) operable to determine a Hybrid Automatic Repeat reQuest-ACKnowledge (HARQ-ACK) codebook size for inter-band time division duplex (TDD) carrier aggregation (CA), the UE comprising:
   one or more processors;
   a memory device including instructions that, when executed by the one or more processors, causes the UE to:
   determine a HARQ bundling window for inter-band TDD CA including a number of downlink (DL) subframes using HARQ-ACK feedback;
   divide the HARQ bundling window into a first part and a second part, wherein the first part of the HARQ bundling window includes DL subframes of configured serving cells that occur no later than the DL subframe where a downlink control information (DCI) transmission for uplink scheduling on a serving cell is conveyed, and the second part of the HARQ bundling window includes physical downlink shared channel (PDSCH) subframes occurring after the DCI transmission of the serving cells; and
   calculate the HARQ-ACK codebook size based on the first part and the second part.

2. The UE of claim 1, wherein:
   the HARQ-ACK codebook size on a physical uplink shared channel (PUSCH) is represented by $O^{ACK}=\Sigma_{c=0}^{N_{cells}^{DL}-1}(B_c^{DL} \times C_c^{DL})$, where $N_{cells}^{DL}$ is the number of configured cells, $B_c^{DL}$ is the number of downlink subframes for which the UE needs to feedback HARQ-ACK bits for the c-th serving cell, c is a non-negative integer, and $C_c^{DL}=1$ if a transmission mode configured in the c-th serving cell supports one transport block (TB) or spatial HARQ-ACK bundling is applied, otherwise $C_c^{DL}=2$.

3. The UE of claim 2, wherein:

$$B_c^{DL} = \min\left(M_c^A, W_{DAI}^{UL} + 4\left\lceil\frac{U - W_{DAI}^{UL}}{4}\right\rceil\right) + M_c^B$$

when a serving cell carrying the uplink grant is not an uplink-downlink (UL-DL) configuration 0, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$ is determined by a downlink assignment index (DAI) in a DCI format 0 or 4 of the serving cell in which uplink control information (UCI) is transmitted on PUSCH according to a Table 7.3-Z of the TS 36.213 in subframe n−k', where k' is defined in the Table 7.3-Y of TS 36.213.

4. The UE of claim 2, wherein:

$$B_c^{DL} = \min\left(M_c^A, W_{DAI}^{UL} + 4\left\lceil\frac{U - W_{DAI}^{UL}}{4}\right\rceil\right) + M_c^B$$

when a serving cell carrying the uplink grant is not uplink-downlink (UL-DL) configuration 0, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}=2$.

5. The UE of claim 2, wherein:
$B_c^{DL}=M_c$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where $M_c$ is a number of elements in the set k ∈ K as defined in a Table 10.1.3.1-1 in a Third Generation Partnership Project (3GPP) Long Term Evolution (LTE) standard Release 11 Technical Specification (TS) 36.213 associated with subframe 'n' for HARQ-ACK feedback, and the set K does not include a special subframe of UL-DL configurations 0 and 5 with normal downlink cyclic prefixing (CP) and the set K does not include a special subframe of UL-DL configurations 0 and 4 with extended downlink CP; otherwise
$B_c^{DL}=M_c-1$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where the set K does include a special subframe of UL-DL configurations 0 or 5 with normal downlink cyclic prefixing (CP) or the set K does include a special subframe of UL-DL configurations 0 or 4 with extended downlink CP.

6. The UE of claim 1, wherein the memory device includes instructions that, when executed by one or more processors, further causes the UE to:
receive an uplink grant in a DCI transmission including downlink assignment index (DAI) information in a value $W_{DAI}^{UL}$ for the first part, wherein the DCI transmission is transmitted with an Long Term Evolution (LTE) DCI format 0 or a DCI format 4.

7. The UE of claim 1, wherein the memory device includes instructions that, when executed by the one or more processors, further causes the UE to:
transmit HARQ-ACK codebook through the physical uplink shared channel (PUSCH) scheduled by the DCI for uplink scheduling.

8. The UE of claim 1, wherein:
the HARQ bundling window with HARQ bundling window size $M_c$ includes a set of DL subframes associated with one uplink (UL) subframe which carries the HARQ-ACK feedbacks as defined in a Table 10.1.3.1-1 in a Third Generation Partnership Project (3GPP) Long Term Evolution (LTE) standard Release 11 Technical Specification (TS) 36.213.

9. The UE of claim 1, wherein a TDD configuration of a primary cell (PCell) in the inter-band TDD CA differs from a TDD configuration of a secondary cell (SCell) in the inter-band TDD CA.

10. The UE of claim 1, wherein the UE includes an antenna, a touch sensitive display screen, a speaker, a microphone, a graphics processor, an application processor, internal memory, or a non-volatile memory port.

11. A computer-implemented method for Hybrid Automatic Repeat reQuest-ACKnowledge (HARQ-ACK) codebook size generation for inter-band time division duplex (TDD) carrier aggregation (CA) at a user equipment (UE), the computer-implemented method comprising:
receiving, using one or more processors, configuration information including a physical downlink shared channel (PDSCH) bundling window for inter-band TDD CA including at least one downlink (DL) subframe using HARQ-ACK feedback;
dividing, using the one or more processors, the PDSCH bundling window into a first part and a second part, wherein the first part of the PDSCH bundling window includes DL subframes of all configured serving cells that occur no later than the DL subframe where a downlink control information (DCI) transmission for uplink scheduling on a serving cell is conveyed, and the second part of the PDSCH bundling windows includes physical downlink shared channel (PDSCH) subframes occurring after the DCI transmission of all the serving cells; and
generating, using the one or more processors, the HARQ-ACK codebook size based on the first part and the second part.

12. The method of claim 11, wherein:
the HARQ-ACK codebook size on a physical uplink shared channel (PUSCH) is represented by $O^{ACK}=\Sigma_{c=0}^{N_{cells}^{DL}-1}(B_c^{DL} \times C_c^{DL})$, where $N_{cells}^{DL}$ is the number of configured cells, $B_c^{DL}$ is the number of downlink subframes for which the UE needs to feedback HARQ-ACK bits for the c-th serving cell, c is a non-negative integer, and $C_c^{DL}=1$ if a transmission mode configured in the c-th serving cell supports one transport block (TB) or spatial HARQ-ACK bundling is applied, otherwise $C_c^{DL}=2$.

13. The method of claim 12, wherein:

$$B_c^{DL} = \min\left(M_c^A, W_{DAI}^{UL} + 4\left\lfloor \frac{U - W_{DAI}^{UL}}{4} \right\rfloor\right) + M_c^B$$

when the DCI transmission includes a $W_{DAI}^{UL}$ value, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n−k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$ is determined by a downlink assignment index (DAI) in a DCI format where uplink control information (UCI) is transmitted on PUSCH according to a Table 7.3-Z of the TS 36.213 in subframe n−k', where k' is defined in the Table 7.3-Y of TS 36.213.

14. The method of claim 12, wherein:

$$B_c^{DL} = \min\left(M_c^A, W_{DAI}^{UL} + 4\left\lfloor \frac{U - W_{DAI}^{UL}}{4} \right\rfloor\right) + M_c^B$$

when the DCI transmission includes a $W_{DAI}^{UL}$ value, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n–k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}=2$.

15. The method of claim 12, wherein:
$B_c^{DL}=M_c$ when the DCI transmission does not include a $W_{DAI}^{UL}$ value, where $M_c=M_c^A+M_c^B$ is a number of elements in the set k ∈ K as defined in a Table 10.1.3.1-1 in a Third Generation Partnership Project (3GPP) Long Term Evolution (LTE) standard Release 11 Technical Specification (TS) 36.213 associated with subframe 'n' for HARQ-ACK feedback, and the set K does not include a PDSCH, $M_c^A$ is a number of DL subframes in a first part, and $M_c^B$ is a number of DL subframes in a second part; otherwise
$B_c^{DL}=M_c-1$ when the DCI transmission does not include a $W_{DAI}^{UL}$ value, and where the set K does include does include a PDSCH.

16. The method of claim 11, further comprising:
receiving an uplink grant in a DCI transmission including downlink assignment index (DAI) information in a value $W_{DAI}^{UL}$ for the first part, wherein the DCI transmission is transmitted with a DCI format used for uplink grants.

17. The method of claim 11, further comprising:
transmitting HARQ-ACK feedback for PDSCH subframes of the HARQ bundling window with the calculated HARQ-ACK codebook size in uplink control information (UCI) on physical uplink shared channel (PUSCH).

18. At least one non-transitory machine readable storage medium comprising a plurality of instructions adapted to be executed to implement the method of claim 11.

19. A user equipment (UE) configured to calculate a Hybrid Automatic Repeat reQuest-ACKnowledge (HARQ-ACK) codebook size for time division duplex (TDD) carrier aggregation (CA), the UE comprising:
one or more processors:
a memory device including instructions that, when executed by the one or more processors, causes the UE to:
determine a HARQ bundling window for inter-band TDD CA including a number of downlink (DL) subframes using HARQ-ACK feedback;
partition the HARQ bundling window into a first part and a second part, wherein the first part of the HARQ bundling window includes DL subframes of configured serving cells that occur no later than the DL subframe where a downlink control information (DCI) transmission for uplink scheduling on a serving cell is conveyed, and the second part of the HARQ bundling window includes physical downlink shared channel (PDSCH) subframes occurring after the DCI transmission of the serving cells; and
determine the HARQ-ACK codebook size based on the first part and the second part and a DCI format.

20. The UE of claim 19, wherein:
the HARQ-ACK codebook size on a physical uplink shared channel (PUSCH) is represented by $O^{ACK}=\sum_{c=0}^{N_{cells}^{DL}-1}(B_c^{DL} \times C_c^{DL})$, where $N_{cells}^{DL}$ is the number of configured cells, $B_c^{DL}$ is the number of downlink subframes for which the UE needs to feedback HARQ-ACK bits for the c-th serving cell, c is a non-negative integer, and $C_c^{DL}=1$ if a transmission mode configured in the c-th serving cell supports one transport block (TB) or spatial HARQ-ACK bundling is applied, otherwise $C_c^{DL}=2$.

21. The UE of claim 20, wherein:

$$B_c^{DL} = \min\left(M_c^A, W_{DAI}^{UL} + 4\left\lceil\frac{U-W_{DAI}^{UL}}{4}\right\rceil\right) + M_c^B$$

when a serving cell carrying the uplink grant is not an uplink-downlink (UL-DL) configuration 0, where $M_c^A$ is a number of DL subframes in a first part, $M_c^B$ is a number of DL subframes in a second part, U denotes a maximum value of $U_c$ among configured serving cells, $U_c$ is a total number of received PDSCHs and physical downlink control channels (PDCCH) indicating downlink semi-persistent scheduling (SPS) release in subframe n-k within the first part on the c-th serving cell, k ∈ K as defined in a Table 10.1.3.1-1 in a Third Generation Partnership Project (3GPP) Long Term Evolution (LTE) standard Release 11 Technical Specification (TS) 36.213, and $W_{DAI}^{UL}$ is determined by a downlink assignment index (DAI) in a DCI format 0 or 4 of the serving cell in which uplink control information (UCI) is transmitted on PUSCH according to a Table 7.3-Z of the TS 36.213 in subframe n-k', where k' is defined in the Table 7.3-Y of TS 36.213.

22. The UE of claim 20, wherein:
$B_c^{DL}=M_c$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where $M_c$ is a number of elements in the set k ∈ K as defined in a Table 10.1.3.1-1 in a Third Generation Partnership Project (3GPP) Long Term Evolution (LTE) standard Release 11 Technical Specification (TS) 36.213 associated with subframe 'n' for HARQ-ACK feedback, and the set K does not include a special subframe of UL-DL configurations 0 and 5 with normal downlink cyclic prefixing (CP) and the set K does not include a special subframe of UL-DL configurations 0 and 4 with extended downlink CP; otherwise
$B_c^{DL}=M_c-1$ when a serving cell carrying the uplink grant is uplink-downlink (UL-DL) configuration 0, a physical uplink control channel (PUCCH) format 3 is configured for a transmission of HARQ-ACK, and detection of a physical downlink control channel (PDCCH) with DCI format 0 or 4 corresponding to subframe 'n'; where the set K does include a special subframe of UL-DL configurations 0 or 5 with normal downlink cyclic prefixing (CP) or the set K does include a special subframe of UL-DL configurations 0 or 4 with extended downlink CP.

23. The UE of claim 19, further comprising:
a transceiver to receive an uplink grant in a DCI transmission including downlink assignment index (DAI) information in a value $W_{DAI}^{UL}$ for the first part, wherein the DCI transmission is transmitted with a DCI format used for uplink grants.

24. The UE of claim 19, further comprising:
a transceiver to transmit HARQ-ACK codebook through the physical uplink shared channel (PUSCH) scheduled by the DCI for uplink scheduling to a node, wherein the node is selected from the group consisting of a base station (BS), a Node B (NB), an evolved Node B (eNB), a baseband unit (BBU), a remote radio head (RRH), a remote radio equipment (RRE), a remote radio unit (RRU), and a central processing module (CPM).

25. A computer implemented method for Hybrid Automatic Repeat reQuest-ACKnowledge (HARQ-ACK) codebook size generation for inter-band time division duplex (TDD) carrier aggregation (CA) at a user equipment (UE), the computer-implemented method comprising:
- receiving, using on or more processors, configuration information including a physical downlink shared channel (PDSCH) bundling window for inter-band TDD CA including at least one downlink (DL) subframe using HARQ-ACK feedback;
- dividing, using one or more processors, the PDSCH bundling window into a first part and a second part; and
- generating, using the one or more processors, the HARQ-ACK codebook size based on a size of the first part of the PDSCH bundling window and a size of the second part of the PDSCH bundling window.

26. The method of claim 25, wherein the first part includes DL subframes of all configured serving cells that occur no later than the DL subframe where a downlink control information (DCI) transmission for uplink scheduling on a serving cell is conveyed, and the second part includes physical downlink shared channel (PDSCH) subframes occurring after the DCI transmission of all the serving cells.

* * * * *